(12) United States Patent
Sears et al.

(10) Patent No.: US 11,543,570 B1
(45) Date of Patent: Jan. 3, 2023

(54) GRADIENT PHOTOCHROMIC DIMMING DEVICE AND OPTICAL ASSEMBLY INCLUDING THE SAME

(71) Applicant: Meta Platforms Technologies, LLC, Menlo Park, CA (US)

(72) Inventors: Jasmine Soria Sears, Kirkland, WA (US); John Goward, Redmond, WA (US); Nathan Matsuda, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 353 days.

(21) Appl. No.: 16/871,956

(22) Filed: May 11, 2020

(51) Int. Cl.
| G02B 5/23 | (2006.01) |
| B29D 11/00 | (2006.01) |
| G02B 1/115 | (2015.01) |
| G02B 1/111 | (2015.01) |
| G02C 7/10 | (2006.01) |

(52) U.S. Cl.
CPC .......... *G02B 5/23* (2013.01); *B29D 11/00653* (2013.01); *G02B 1/111* (2013.01); *G02B 1/115* (2013.01); *G02C 7/102* (2013.01)

(58) Field of Classification Search
CPC ... G02B 5/23; G02B 5/22; G02B 5/20; G02B 1/111; G02B 1/115; B29D 11/00653; G02C 7/102; G02C 7/10

USPC .......................................................... 359/241
See application file for complete search history.

(56) References Cited

U.S. PATENT DOCUMENTS

| 4,155,734 A * | 5/1979 | Krohn .................... A61F 2/16 |
| | | 501/59 |
| 4,289,497 A | 9/1981 | Hovey |
| 5,914,193 A * | 6/1999 | Ono ..................... B29D 11/00 |
| | | 427/255.6 |
| 9,678,363 B2 | 6/2017 | Ang et al. |
| 2008/0187760 A1 | 8/2008 | Wiand |
| 2013/0248350 A1* | 9/2013 | Sukhomlinova ....... C09K 19/60 |
| | | 252/299.01 |
| 2017/0219829 A1* | 8/2017 | Bailey ................ G02B 27/0172 |
| 2019/0224803 A1* | 7/2019 | Masad ................ B24B 13/0055 |
| 2019/0358919 A1* | 11/2019 | Kumar ................... G02C 7/024 |

FOREIGN PATENT DOCUMENTS

GB          1520099          8/1978

* cited by examiner

*Primary Examiner* — William R Alexander
(74) *Attorney, Agent, or Firm* — Millburn IP PLLC

(57) ABSTRACT

An optical dimming device is provided. The optical dimming device includes a photochromic element including a photochromic composition. The photochromic composition includes a combination of a first photochromic material and a second photochromic material having different steady-state absorption profiles. In a direction from a first portion to a second portion of the photochromic element, a concentration of the first photochromic material in the combination decreases and a concentration of the second photochromic material in the combination increases.

20 Claims, 18 Drawing Sheets

GRADIENT PHOTOCHROMIC DIMMING DEVICE AND OPTICAL ASSEMBLY INCLUDING THE SAME

TECHNICAL FIELD

The present disclosure relates generally to optical devices and, more specifically, to a gradient photochromic dimming device and an optical assembly including the same.

BACKGROUND

Photochromic materials absorb one or more of an ultraviolet ("UV") light, a blue light, and a violet light, and change from a clear state to a dark state. Photochromic materials in the dark state may revert back to the clear state in the absence of UV light, the blue light, and/or the violet light. The process of reverting back to the clear state may be expedited when the photochromic materials are subject to heat or an electromagnetic radiation. Photochromic materials have various applications in a number of fields, such as sunglasses, graphics, ophthalmic lenses, solar control window films, security and authenticity labels, etc. For example, photochromic lenses, sometimes referred to as transition lenses, can be used as eyeglass lenses that become dark in sunlight when exposed to an activating light of a sufficiently high frequency, such as a UV irradiation, and become clear again when moved away from the activating light (e.g., when moved indoor). The transition between the dark state and the clear state is a result of chemical responses of the photochromic materials to the presence (and absence) of the UV light.

SUMMARY

Consistent with a disclosed embodiment of the present disclosure, an optical dimming device is provided. The optical dimming device includes a photochromic element including a photochromic composition. The photochromic composition includes a combination of a first photochromic material and a second photochromic material having different steady-state absorption profiles. In a direction from a first portion to a second portion of the photochromic element, a concentration of the first photochromic material in the combination decreases and a concentration of the second photochromic material in the combination increases.

Consistent with a disclosed embodiment of the present disclosure, an optical dimming device is provided. The optical dimming device includes a photochromic element including a photochromic composition. The optical dimming device also includes a heating element coupled to the photochromic element and configured to realize a gradient temperature of the photochromic element. The heating element includes a plurality of heating units, and a distribution density of the heating units changes along a direction from a first portion to a second portion of the photochromic element in a gradient manner.

Consistent with a disclosed embodiment of the present disclosure, an optical assembly is provided. The optical assembly includes an optical combiner including a first side facing a real world environment and an opposing second side facing an eye-box of the optical assembly. The optical assembly also includes an optical dimming device disposed at the first side of the optical combiner and configured to provide a gradient dimming effect to a first light from the real world environment and output a second light to the optical combiner. The optical dimming device includes a photochromic element including a combination of a first photochromic material and a second photochromic material having different steady-state absorption profiles for the first light. In a direction from a first portion to a second portion of the photochromic element, a concentration of the first photochromic material in the combination decreases and a concentration of the second photochromic material in the combination increases. The optical combiner is configured to combine a third light from a light source and the second light and output a combined light to the eye-box.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
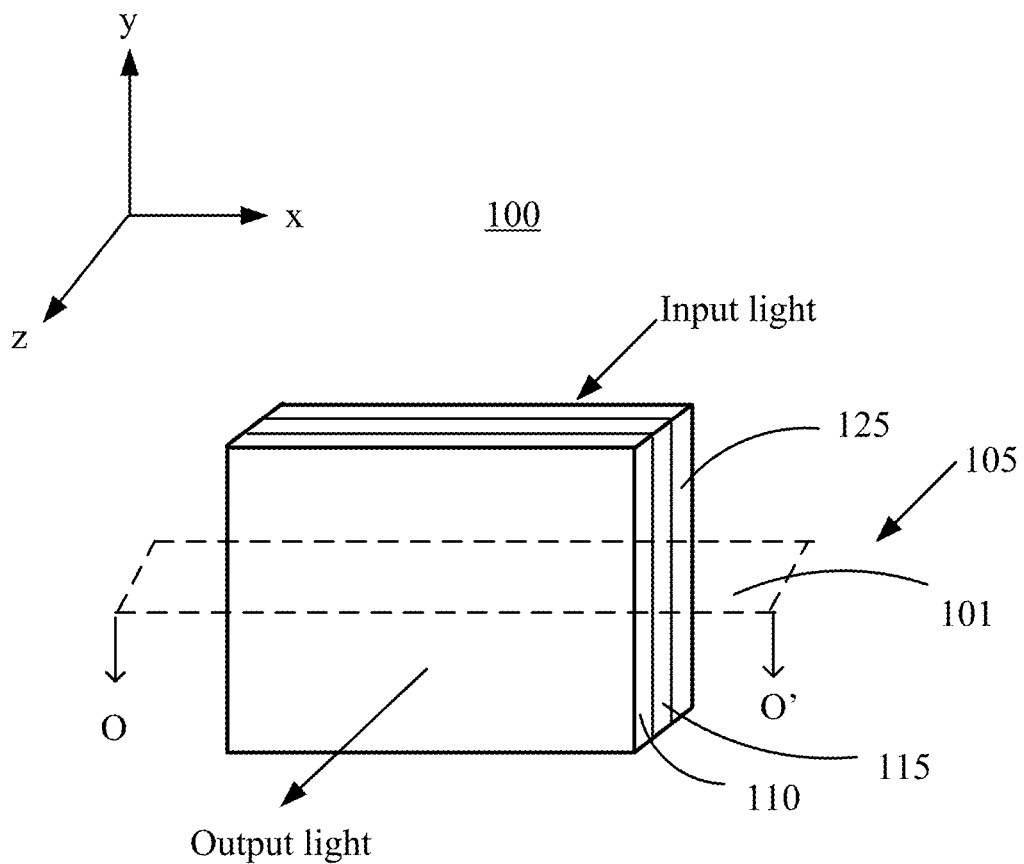
FIG. 1A illustrates a schematic perspective view of a photochromic dimming device, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" has a meaning similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

Photochromic materials undergo reversible photoisomerization between at least two stable states (or steady-states) having distinct light absorption effects or profiles. During the reversible photoisomerization process, some physical properties of the photochromic materials, such as absorption spectra, fluorescence emission, conjugation, electron conductivity, dipole interaction, and geometric shape may be changed when the photochromic materials are subject to an activating energy (e.g., an activating light irradiation). Photochromic materials exhibit a photochromic phenomenon, according to which a color of the photochromic materials may reversibly change depending on the presence or the absence of an activating light having a sufficiently high frequency, such as a UV light, a blue light, and/or a violet light. For example, the photochromic materials may change from a clear steady-state (or referred to as "a clear state") to a dark steady-state (or referred to as "a dark state") when exposed to a UV light, and may revert back to the clear steady-state in the absence of the UV light. The dark steady-state may also be referred to as a colored steady-state, as the photochromic materials may exhibit a grey or dark color tint at the dark steady-state. The clear steady-state may also be referred to as a colorless steady-state, as the photochromic materials may be visually transparent at the clear steady-state.

The process of reverting back to the clear steady-state may be expedited by exposing the photochromic materials to other types of activating energy, such as a heat or an electromagnetic radiation. For example, some photochromic materials may take a longer time to return to the clear steady-state in a low temperature environment, and may not achieve a substantially dark steady-state in a high temperature environment, as the photo-induced (e.g., UV-induced) transition to the dark steady-state may be counteracted by a thermally-induced rapid reversion to the clear steady-state. Such photochromic materials may be referred to as thermally-reversible photochromic materials, which may return to the clear steady-state at a rate dependent on a temperature (e.g., an ambient temperature). Some photochromic materials may absorb lights of different wavelengths to drive transitions to both the dark and clear steady-states, where the ambient temperature may have little or no effect on a transition speed and steady-state (e.g., dark and clear steady-states) properties. Such photochromic materials may be referred to as thermally-stable photochromic materials. In some embodiments, one or more infrared ("IR"), visible, and/or UV light sources may be arranged adjacent the photochromic material, and energized as needed to irradiate the photochromic material. For example, a thermally-stable photochromic material may absorb an activating light having a predetermined wavelength to change from the clear steady-state to the dark steady-state, and absorb a light having a wavelength different from the predetermined wavelength of the activating light to return to the clear steady-state.

The present disclosure provides a photochromic dimming device configured to provide a gradient dimming effect in a predetermined direction across the photochromic dimming device for an incoming light in a predetermined spectrum (e.g., visible spectrum). For example, the predetermined direction may be from an upper portion of the photochromic dimming device to a lower portion of the photochromic dimming device. In some embodiments, the upper portion and the lower portion may be defined in a vertical direction when a user places the photochromic dimming device in front of eyes of the user.

For example, the photochromic dimming device may be configured to have a gradient absorption effect in the predetermined direction for at least a visible light. The phrases "gradient dimming effect" may refer to a dimming effect that gradually changes (e.g., in a gradient manner) in the predetermined direction across the photochromic dimming device, such as from a first portion of a photochromic dimming device to a second portion of the photochromic dimming device. In some embodiments, the first portion may correspond to the upper portion of the photochromic dimming device, and the second portion may correspond to the lower portion of the photochromic dimming device. The first portion and the second portion are not limited to the upper and lower portions of the photochromic dimming device. The predetermined direction across the photochromic dimming device may be any suitable direction, and thus, the first portion and the second portion may be any suitable corresponding portions of the photochromic dimming device. In some embodiments, the dimming effect may be stronger at the first portion (e.g., upper portion) of the photochromic dimming device than at the second portion (e.g., lower portion) of the photochromic dimming device. For example, the dimming effect of the photochromic dimming device for at least a visible light may gradually decrease from the first portion (e.g., the upper portion) to the second portion (e.g., the lower portion) of the photochromic dimming device. The phrases "gradient absorption" may refer to a light absorption that gradually changes (e.g., in a gradient manner) in the predetermined direction of the photochromic dimming device, for example, from the first portion to the second portion of the photochromic dimming device. For example, the light absorption may be higher (or stronger) at the first portion of the photochromic dimming device than at the second portion of the photochromic dimming device. For example, the light absorption of the photochromic dimming device for at least a visible light may gradually decrease from the first portion (e.g., the upper portion) of the photochromic dimming device to the second portion (e.g., the lower portion) of the photochromic dimming device.

The photochromic dimming device may include a photochromic element, which may include a photochromic composition (or a composition of one or more photochromic materials). In some embodiments, the photochromic composition may be in a form of an individual layer, film, or plate (referred to as a photochromic composition layer for discussion purposes), which may be separately provided at a surface of another optical element, such as a base substrate. In some embodiments, the photochromic composition may not be provided as a separate layer, film, or plate. Rather, the photochromic composition may be at least partially disposed within a main body of another optical element, such as a base substrate (e.g., as an integral part of the base substrate). For example, the photochromic element may include a base material or a base substrate, and the photochromic composition may be integrally dispersed in the base material or base substrate.

The photochromic composition (regardless of the integral form or individual layer form) may include one or more photochromic materials exhibiting a photochromic phenomenon, in which a color of the photochromic material may reversibly change depending on the presence or the absence of an activating energy (e.g., a UV light). The photochromic materials may include inorganic photochromic compounds, organic photochromic compounds, or a combination thereof. In some embodiments, the photochromic materials may include photochromic compounds (e.g., photochromic dyes), inorganic materials containing photochromic moieties with reversible structural changes, organic materials (e.g., liquid crystals, polymers, etc.) containing photochromic moieties with reversible structural changes, or a combination thereof. In some embodiments, the photochromic composition may include photochromic materials dispersed in a base material (e.g., resin, polymer, glass, etc.). In some embodiments, the photochromic composition may include one or more host materials (e.g., liquid crystals) doped with photochromic materials.

In some embodiments, the photochromic composition may include a combination of photochromic materials having different dark steady-state absorption effects or profiles. The gradient dimming effect of the photochromic dimming device may be realized by configuring gradient concentrations of the respective photochromic materials in the combination across the photochromic dimming substrate. The phrase "gradient concentration" may refer to a concentration that gradually changes (e.g., in a gradient manner) in the predetermined direction of the photochromic dimming device, e.g., from a first portion of the photochromic element to a second portion of the photochromic element. For example, the concentration of the photochromic materials may be higher at the first portion than at the second portion. The concentration may gradually decrease from the first portion (e.g., the upper portion) of the photochromic element to the second portion (e.g., the lower portion) of the photochromic element.

In some embodiments, the photochromic composition may include a combination of a first photochromic material and a second photochromic material having different dark steady-state absorption effects or profiles. In some embodiments, the first photochromic material may be mixed with the second photochromic material. In some embodiments, the first photochromic material at the dark steady-state may have a higher absorption effect for an incoming light within a predetermined wavelength range (e.g., a visible spectrum) than the second photochromic material at the dark steady-state. That is, the first photochromic material may visually appear darker than the second photochromic material when both of the first and second photochromic materials are subject to a substantially same UV irradiation. The photochromic element may have a first portion and a second portion that are located at opposite ends of the photochromic element. In some embodiments, the first portion and second portion of the photochromic element may correspond to the upper portion and lower portion of the photochromic element in a vertical direction when the photochromic element is placed in front of one or two eyes of the user. In some embodiments, along a direction from the first portion to the second portion of the photochromic element, a concentration of the first photochromic material in the combination may decrease in a gradient manner, and a concentration of the second photochromic material in the combination may increase in a gradient manner. In other words, the concentration of the first photochromic material may be higher at the first portion (e.g., upper portion) than at the second portion (e.g., lower portion). The concentration of the second photochromic material may be higher at the second portion (e.g., lower portion) than at the first portion (e.g., upper portion). Through selecting suitable distribution profiles of gradient concentrations of the first photochromic material and the second photochromic material, the photochromic dimming device may exhibit a gradient dimming effect for at least visible lights, in the direction from the first portion to the second portion of the photochromic element.

In some embodiments, the gradient dimming effect of the photochromic dimming device may be realized by configuring a gradient temperature for the photochromic element. The phrase "gradient temperature" may refer to a temperature that gradually changes (e.g., in a gradient manner) in the predetermined direction of the photochromic element, such as from a first portion of the photochromic element to a second portion of the photochromic element. In other words, the temperature of the photochromic element may be higher (or lower) at the first portion than at the second portion. In some embodiments, the photochromic composition included in the photochromic element may include one or more thermally-reversible photochromic materials. In some embodiments, at the dark steady-state, the thermally-reversible photochromic materials may have a higher absorption effect at a higher temperature and a lower absorption effect at a lower temperature. In such embodiments, the gradient temperature may be configured to gradually decrease from an upper portion (or first portion) of the photochromic element to a lower portion (or second portion) of the photochromic element. Accordingly, a higher absorption effect may be provided at the upper portion (or first portion) and a lower absorption effect may be provided at the lower portion (or second portion) of the photochromic element. In some embodiments, at the dark steady-state, the thermally-reversible photochromic materials may have a lower absorption effect at a higher temperature and a higher absorption effect at a lower temperature. In such embodiments, the gradient temperature may be configured to gradually increase from the upper portion (or first portion) of the photochromic element to the lower portion (or second portion) of the photochromic element. Accordingly, a higher absorption effect may be provided at the upper portion (or first portion) and a lower absorption effect may be provided at the lower portion (or second portion).

In some embodiments, the photochromic dimming device may include a heating element coupled to the photochromic element. In some embodiments, the heating element may include a resistive heating element, such as a resistive wire. The heating element may be configured to control the temperature of the photochromic element. For example, the heating element may be controlled to provide a gradient temperature in the photochromic element, which may cause the photochromic element to provide a gradient absorption effect in the predetermined direction of the photochromic element.

In some embodiments, the heating element may include a plurality of heating units. A distribution density of the heating units may change (e.g., decrease) along a direction from the first portion (e.g., upper portion) to the second portion (e.g., lower portion) of the photochromic element in a gradient manner. Heat generated by the heating units may change (e.g., decrease) along the predetermined direction from the first portion (e.g., upper portion) to the second portion (e.g., lower portion) of the photochromic dimming device in a gradient manner. Thus, the temperature of the photochromic element may change (e.g., decrease) along the predetermined direction from the first portion to the second portion of the photochromic element in a gradient manner. Accordingly, absorption effect of the photochromic element may change in a gradient manner in the predetermined direction of the photochromic element. As a result, in the predetermined direction from the first portion to the second portion of the photochromic element, the photochromic dimming device may exhibit a gradient dimming effect for an incoming light within the predetermined wavelength range, which gradually decreases from the first portion (e.g., upper portion) of the photochromic element to the second portion (e.g., lower portion) of the photochromic element.

In some embodiments, the plurality of heating units may be uniformly distributed in the heating element. Different amounts of energy (e.g., electrical energy) may be supplied to the uniformly distributed heating units to generate a gradient temperature distribution in the predetermined direction across the heating element. As a result, the photochromic element may have a gradient temperature in the predetermined direction across the photochromic element, which may cause a gradient absorption effect in the predetermined direction across photochromic element. Accordingly, the photochromic dimming device may exhibit a gradient dimming effect for an incoming light within the predetermined wavelength range, which gradually decreases from the first portion (e.g., upper portion) of the photochromic element to the second portion (e.g., lower portion) of the photochromic element.

FIG. 1A schematically illustrates a perspective view of a photochromic dimming device 100, according to an embodiment of the present disclosure. The photochromic dimming device 100 may include a plurality of optical elements. For example, the photochromic dimming device 100 may include a photochromic element 105 in the form of a photochromic composition layer 115, a base substrate 110, and a cover substrate 125. The photochromic element 105 in the form of the photochromic composition layer 115 may be disposed between the base substrate 110 and the cover substrate 125. For example, the photochromic composition layer 115 may be disposed at a surface of the base substrate 110. In some embodiments, the base substrate 110 may be a part of the photochromic element 105.

Although FIG. 1A shows that the photochromic dimming device 100 includes a rectangular plate shape, the shape of the photochromic dimming device 100 is not limited to the rectangular plate shape, and may be any suitable shapes. In addition, although the photochromic dimming device 100 is shown as having flat surfaces, in some embodiments, the photochromic dimming device 100 may have one or more curved surfaces.

Figure 1B:
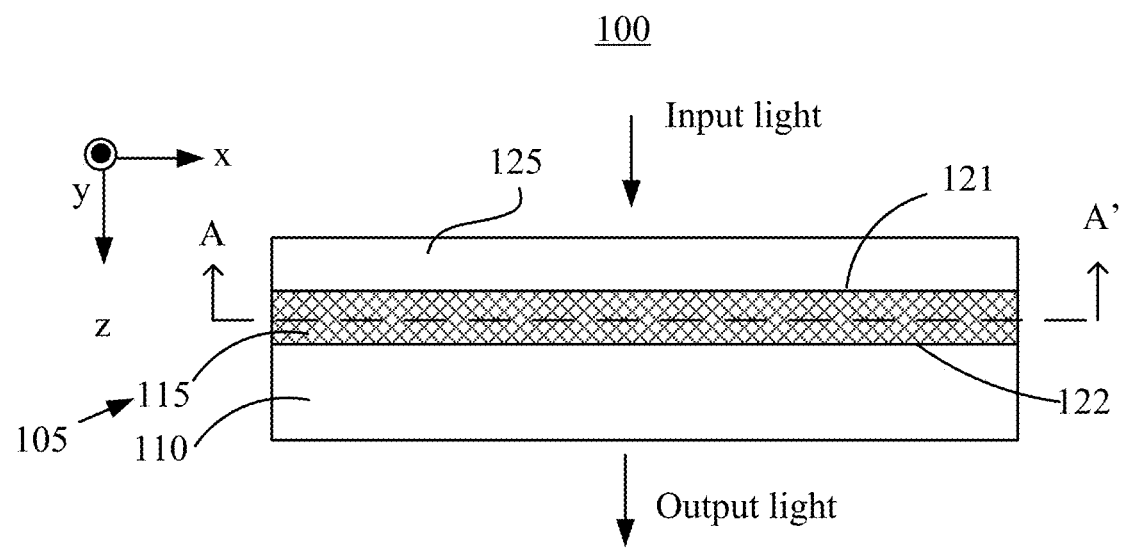
FIG. 1B illustrates a schematic cross-sectional view of the photochromic dimming device shown in FIG. 1A, according to an embodiment of the present disclosure.

FIG. 1B illustrates a schematic cross-sectional view of the photochromic dimming device 100 shown in FIG. 1A taken along a plane 101 in a direction indicated by the O-O' line, according to an embodiment of the present disclosure. As shown in FIG. 1B, the base substrate 110 may support and protect the photochromic composition layer 115 disposed at a surface of the base substrate 110. The base substrate 110 may be substantially transparent to lights in the visible spectrum (e.g., about 380 nm to about 700 nm). In some embodiments, the base substrate 110 may also be substantially transparent to lights in at least a portion of the infrared ("IR") spectrum (e.g., about 700 nm to about 1 mm, or any portion thereof). For example, the base substrate 110 may include a glass, a plastic, a polymer, a sapphire, etc. The base substrate 110 may be rigid, semi-rigid, soft, flexible, or semi-flexible. The base substrate 110 may have one or more flat surfaces and/or one or more curved surfaces. In some embodiments, the base substrate 110 may be a part of another optical device or a part of another optoelectrical device. For example, the base substrate 110 may be a part of a functional device, such as a display screen. In some embodiments, the base substrate 110 may be a part of an optical lens assembly, such as a lens substrate of the optical lens assembly.

The photochromic element in the form of the photochromic composition layer 115 may include a photochromic composition. The photochromic composition may include one or more photochromic materials, as described above. For example, the photochromic composition may include a combination of photochromic materials having different dark steady-state absorption profiles within a predetermined wavelength range, e.g., a visible wavelength range. An absorption profile indicates light absorption of a photochromic material over the predetermined wavelength range. The dark steady-state absorption profile is the absorption profile of the photochromic material at the dark steady state. The photochromic materials may include suitable materials exhibiting a photochromic phenomenon according to which a color of the material may reversibly change depending on the presence or the absence of an activating energy (e.g., a UV light). The photochromic materials may include inorganic photochromic compounds, organic photochromic compounds, or a combination thereof. In some embodiments, the photochromic materials may include photochromic compounds (e.g., photochromic dyes), inorganic materials containing photochromic moieties with reversible structural changes, organic materials (e.g., liquid crystals, polymers) containing photochromic moieties with reversible structural changes, or a combination thereof. In some embodiments, the photochromic composition may also include other suitable ingredients, such as UV stabilizer compounds configured to improve the light fatigue resistance of the photochromic materials, e.g., benzophenones, phosphites, triazines, benzotriazoles, or a combinations thereof.

Figure 1C:
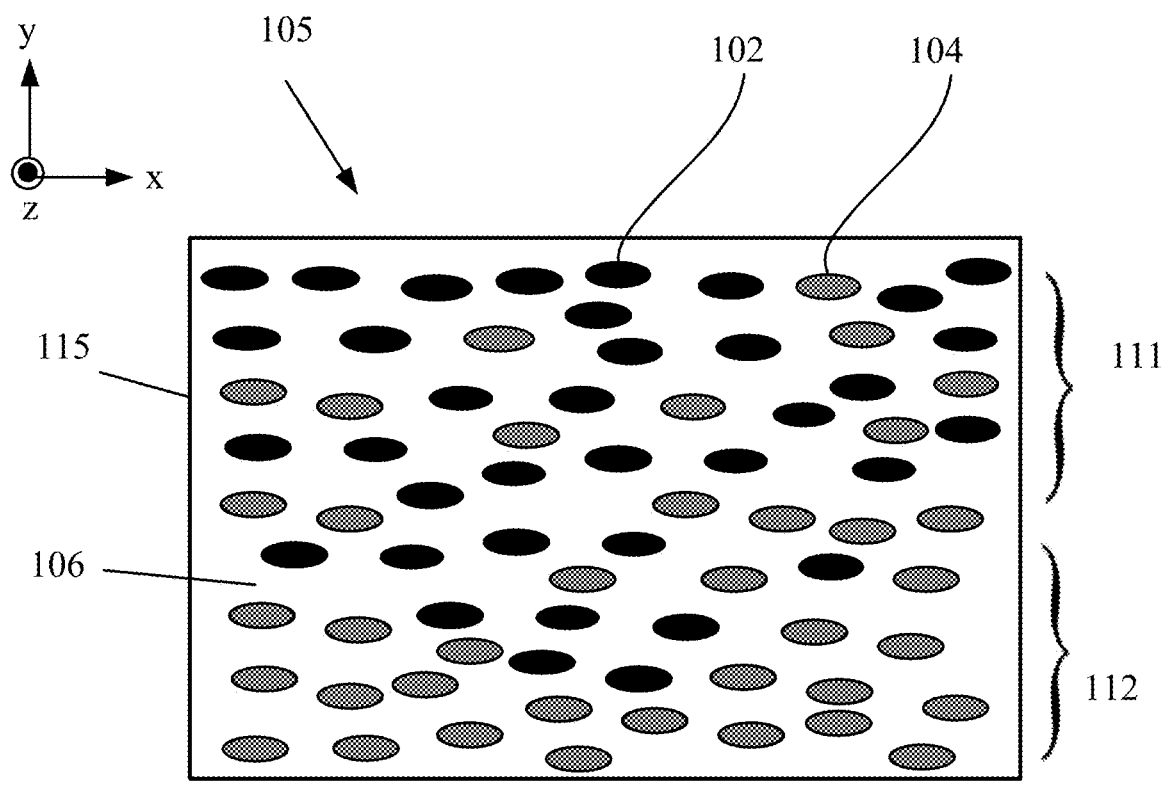
FIG. 1C illustrates a schematic cross-sectional view of a photochromic composition layer included in the photochromic dimming device, taken along the A-A' line, as shown in FIG. 1B, according to an embodiment of the present disclosure.

FIG. 1C illustrates a schematic cross-sectional view of the photochromic element 105 in the form of the photochromic composition layer 115 included in the photochromic dimming device 100, taken along the A-A' line as shown in FIG. 1B, according to an embodiment of the present disclosure. For illustrative purposes, FIG. 1C shows that the photochromic composition of the photochromic composition layer 115 (or the photochromic element 105) may include a combination of a first photochromic material 102 and a second photochromic material 104 having different steady-state absorption effects or profiles. The first photochromic material 102 at a steady-state may have a higher absorption than the second photochromic material 104 at the steady-state within a predetermined wavelength range, e.g., a visible wavelength range. That is, the first photochromic material 102 may visually appear darker than the second photochromic material 104 when subject to a substantially same UV irradiation.

In some embodiments, the photochromic composition layer 115 (or the photochromic element 105) may also include a base material 106 (e.g., resin, polymer, etc.). The first photochromic material 102 and the second photochromic material 104 may be dispersed in the base material 106. For example, the photochromic composition materials 102 and 104 may be mixed with polymerizable monomers. The mixture may be dispensed at a surface of the base substrate 110 (e.g., through spin coating). After polymerization, the monomers may be polymerized to form the based material 106, and the mixture may be polymerized to form the photochromic composition layer 115 where the first photochromic material 102 and the second photochromic material 104 are dispersed in the base material 106. In some embodiments, the photochromic composition layer 115 may not include the base material 106. For example, the photochromic composition including the one or more photochromic materials 102 and 104 may be dissolved in a solvent to form a photochromic composition solution, which may be dispensed on the base substrate 110 (e.g., through spin coating). The solvent may be evaporated when the photochromic composition solution is heated at an elevated temperature to form the photochromic composition layer 115 at the surface of the base substrate 110.

As shown in FIG. 1C, the photochromic composition layer 115 may have a first portion 111 (e.g., an upper portion as shown in FIG. 1C in the vertical direction, i.e., y-axis direction) and a second portion 112 (e.g., a lower portion as shown in FIG. 1C in the vertical direction, i.e., y-axis direction) that are located at opposite ends of the photochromic composition layer 115. In some embodiments, the concentration of the first photochromic material 102 in the photochromic composition may change in a gradient manner from a highest concentration to a lowest concentration in a direction from the first portion 111 of the photochromic composition layer 115 to the second portion 112 of the photochromic composition layer 115. The concentration of the second photochromic material 104 in the photochromic composition may change in a gradient manner from a lowest concentration to a highest concentration in the direction from the first portion 111 of the photochromic composition layer 115 to the second portion 112 of the photochromic composition layer 115. That is, from the first portion 111 (e.g., upper portion) to the second portion 112 (e.g., lower portion) of the photochromic composition layer 115, the concentration of the first photochromic material 102 in the photochromic composition may gradually decrease from a highest concentration value to a lowest concentration value (the lowest concentration value may be substantially zero), and the concentration of the second photochromic material 104 in the photochromic composition may gradually increase from a lowest concentration value (the lowest concentration value may be substantially zero) to a highest concentration value. For example, from the first portion 111 to the second portion 112 of the photochromic composition layer 115, the concentration of the first photochromic material 102 in the photochromic composition may gradually decrease from about 90% to about 10%, and the concentration of the second photochromic material 104 in the photochromic composition may gradually increase from about 10% to about 90%. The percentage may be weight or volume percentage.

In some embodiments, the first photochromic material 102 at the dark steady-state may have a higher absorption than the second photochromic material 104 at the dark steady-state for at least the visible lights. Accordingly, the absorption of the photochromic composition layer 115 for at least the visible lights may change in a gradient manner from a highest absorption at the first portion 111 to a lowest absorption at the second portion 112 of the photochromic composition layer 115. That is, from the first portion 111 to the second portion 112 of the photochromic composition layer 115 (or the photochromic element 105), the absorption of the photochromic composition layer 115 may gradually decrease from a highest absorption effect to a lowest absorption effect (the lowest absorption effect may be substantially zero). Thus, the dimming effect of the photochromic dimming device 100 for at least the visible lights may change in a gradient manner from a strongest dimming effect to a weakest dimming effect in a direction from a first portion (e.g., an upper portion) of the photochromic dimming device 100 (corresponding to the first portion 111 of the photochromic composition layer 115) to a second portion (e.g., a lower portion) of the photochromic dimming device 100 (corresponding to the second portion 112 of the photochromic composition layer 115). In other words, the light transmittance of the photochromic dimming device 100 may gradually increase in the direction from the first portion (e.g., the upper portion) of the photochromic dimming device 100 (corresponding to the first portion 111 of the photochromic composition layer 115) to the second portion (e.g., the lower portion) of the photochromic dimming device 100 (corresponding to the second portion 112 of the photochromic composition layer 115).

In some embodiments, the gradient concentration distributions of the first photochromic material 102 and the second photochromic material 104 within the photochromic composition layer 115 may also result in different color tints and/or switching time behaviors (between the dark steady state and clear steady state) in the first portion 111 and in the second portion 112 of the photochromic composition layer 115, in addition to the light transmittance or light absorption difference. For example, in some embodiments, the first portion 111 may be darker than the second portion 112. In some embodiments, a speed of switching the first portion 111 from the dark steady state to the clear steady state (or from the clear steady state to the dark steady state) may be faster than a speed of switching the second portion 112 from the dark steady state to the clear steady state (or from the clear steady state to the dark steady state). In some embodiments, a speed of switching the first portion 111 from the dark steady state to the clear steady state (or from the clear steady state to the dark steady state) may be slower than a speed of switching of the second portion 112 from the dark steady state to the clear steady state (or from the clear steady state to the dark steady state). In some embodiments, a speed of switching the first portion 111 from the clear steady state to the dark steady state may be faster than a speed of switching of the second portion 112 from the clear steady state to the dark steady state, and a speed of switching the first portion 111 from the dark steady state to the clear steady state may be slower than a speed of switching of the second portion 112 from the dark steady state to the clear steady state. For example, when a user moves from indoor to outdoor, the upper portion (e.g., first portion 111) of a lens having the photochromic dimming device 100 may transition from the clear steady state to the dark steady state at a faster speed than the lower portion (e.g., second portion 112), such that the upper portion may provide shading for the eyes of the user relatively quickly, while the lower portion still allows the light to transmit therethrough to enable the user to observe the surrounding environment. When the user moves from outdoor to indoor, the lower portion (e.g., second portion 112) may transition from the dark state to the clear state in a speed that is faster than the upper portion (e.g., first portion 111) to allow the user to observe the surrounding environment. When a user of the photochromic dimming device 100 places or wears the photochromic dimming device 100 in front of one or two eyes of the user, the photochromic dimming device 100 may shield the one or two eyes of the user from bright overhead sunlight or a bright overhead light source at the upper portion, while allowing more light to transmit through the lower portion of the photochromic dimming device 100. Thus, a better shielding effect may be provided to the user.

Figure 1D:
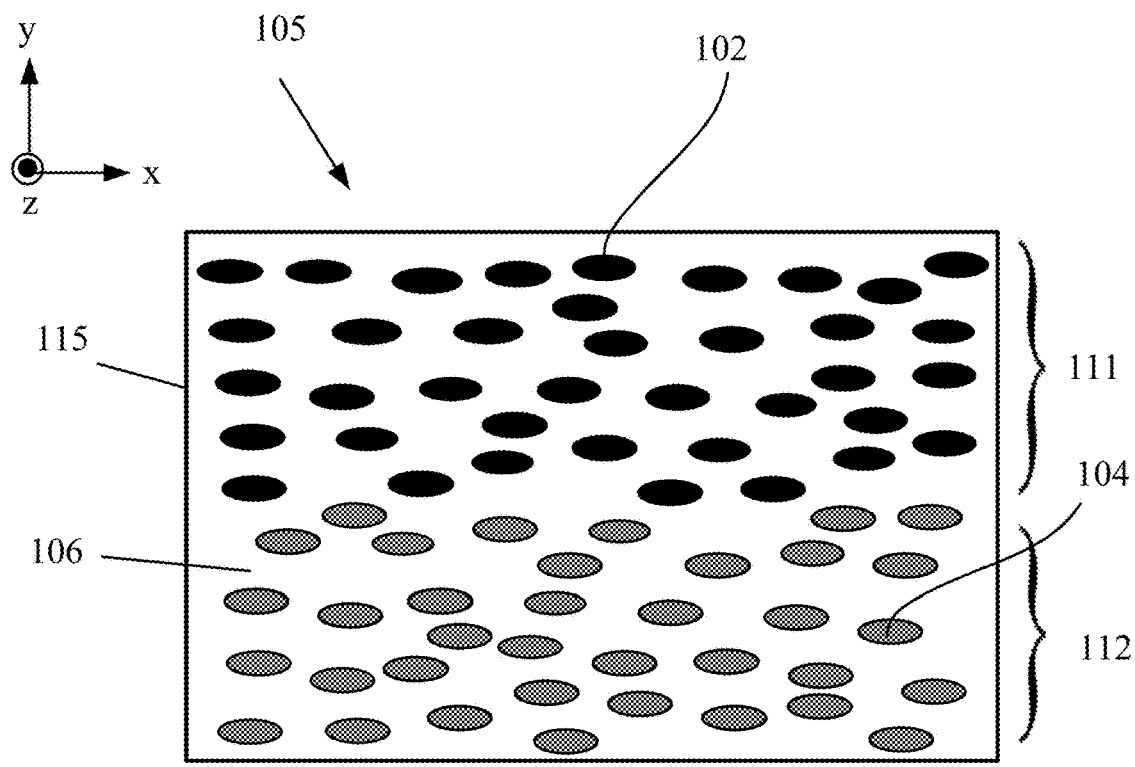
FIG. 1D illustrates a schematic cross-sectional view of a photochromic composition layer included in the photochromic dimming device, according to an embodiment of the present disclosure.

FIG. 1C shows that the first photochromic material 102 and the second photochromic material 104 may be mixed together throughout the entire photochromic composition layer 115. In some embodiments, the first photochromic material 102 and the second photochromic material 104 may not be mixed throughout the entire photochromic composition layer 115. Instead, the photochromic material 102 and the second photochromic material 104 may be separately distributed in different portions, as shown in FIG. 1D. For example, the first photochromic material 102 having a higher steady-state absorption effect or profile may be disposed at the first portion 111 (e.g., a higher portion in the vertical direction) and the second photochromic material 104 having a lower steady-state absorption effect or profile may be disposed at the second portion 112 (e.g., a lower portion in the vertical direction). The distribution of the first photochromic material 102 and the second photochromic material 104 in each portion may be uniform or non-uniform. In some embodiments, the first portion 111 may include the first photochromic material 102 uniformly distributed to provide a constant absorption effect across the vertical direction. In some embodiments, the first portion 111 may include the first photochromic material 102 distributed non-uniformly (e.g., distributed in a gradient manner from top to bottom) to provide a gradient absorption effect. For example, the distribution density may have a gradient variation from top to bottom within the first portion 111 to provide a gradient absorption effect. Likewise, the second portion 112 may include the second photochromic material 104 distributed non-uniformly (e.g., distributed in a gradient manner from top to bottom) to provide a gradient absorption effect. For example, the distribution density may have a gradient variation from top to bottom within the second portion 112 to provide a gradient absorption effect.

Figure 1E:
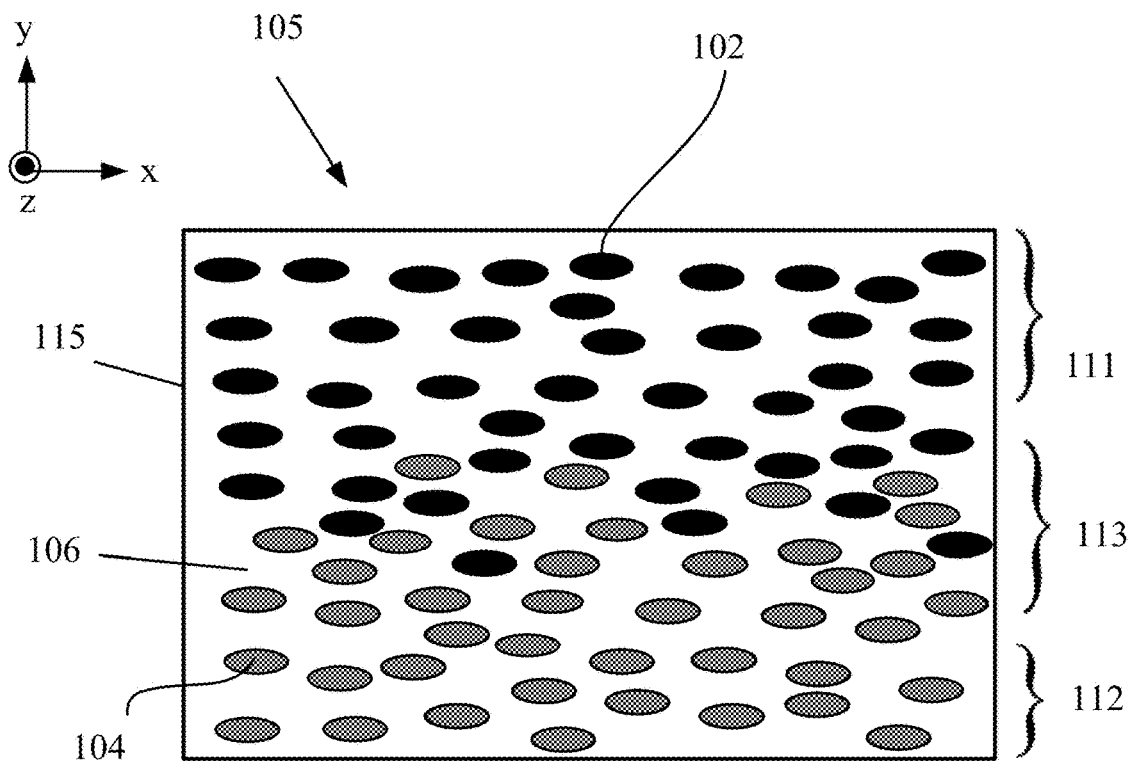
FIG. 1E illustrates a schematic cross-sectional view of a photochromic composition layer included in the photochromic dimming device, according to an embodiment of the present disclosure.

In some embodiments, as shown in FIG. 1E, the photochromic element 105 may include three or more portions. The first portion 111 (e.g., top or upper portion) may include the first photochromic material 102, the second portion 112 (e.g., bottom or lower portion) may include the second photochromic material 104, and a third portion 113 (e.g., middle portion) may include a mixture of the first photochromic material 102 and the second photochromic material 104. The mixture may include a gradient absorption effect or profile in the vertical direction. For example, the top portion 111 having the first photochromic material 102 may provide a relatively high absorption effect, and the bottom portion 112 having the second photochromic material 104 may provide a relatively low absorption effect. The middle portion 113 may have a suitable mixture of the first photochromic material 102 and the second photochromic material 104 to provide a gradient absorption effect, gradually decreasing from a high absorption effect at the interface with the top portion 111 to a low absorption effect at the interface with the bottom portion 112.

In some embodiments, more than two (e.g., three, four, five, six, etc.) photochromic materials having different steady-state absorption effects or profiles may be separately disposed at more than two (e.g., three, four, five, six, etc.) portions of the photochromic element 105 in the vertical direction (e.g., the y-axis direction). At least one portion (e.g., each portion) of the first portion 111, the second portion 112, and/or the third portion 113 may include a specific photochromic material having a constant steady-state absorption effect or profile. For example, in the three portion configuration shown in FIG. 1E, instead of including a mixture of the first photochromic material 102 and the second photochromic material 104, the third portion 113 may include a third photochromic material different from the first photochromic material 102 or the second photochromic material 104. In some embodiments, when four portions are included in the photochromic element 105, the fourth portion may include a fourth photochromic material different from the first, second, or third photochromic material. The fourth photochromic material may provide a fourth constant steady-state absorption effect. In some embodiments, the different steady-state absorption effects in different portions may be provided by the same photochromic material with different configurations (e.g., different distribution of density). The constant steady-state absorption effects or profiles across different portions may gradually change from top to bottom in the vertical direction (e.g., from higher constant steady-state absorption effect to lower constant steady-state absorption effect) of the photochromic element 105. In some embodiments, at least one portion (e.g., each portion) may include a gradient steady-state absorption effect or profile. The gradient steady-state absorption effect or profile in the at least one portion (e.g., each portion) may be provided by a single photochromic material having a gradient density distribution, or by a mixture of two or more photochromic materials having a gradient absorption effect or profile. Other configurations for providing the gradient steady-state absorption effect or profile may be used in at least one portion (e.g., each portion). The manners (or configurations) through which the gradient steady-state absorption effect or profile is provide in different portions may be different. The gradient steady-state absorption effects or profiles of across different portions may provide an overall gradual change in the absorption effect from the top to the bottom of the photochromic element 105 in the vertical direction.

In some embodiments, the first portion 111 may include the first photochromic material 102 configured in a suitable manner to provide a gradient absorption effect within the first portion in the vertical direction. The second portion 112 may include the second photochromic material 104 configured in a suitable manner to provide a gradient absorption effect within the second portion in the vertical direction. The third portion 113 may include a third photochromic material configured in a suitable manner to provide a gradient absorption effect within the third portion in the vertical direction.

In some embodiments, the photochromic dimming device 100 may also include other elements. In some embodiments, referring to FIG. 1B, the photochromic dimming device 100 may also include the cover substrate 125. The photochromic composition layer 115 may have a first side 121 that receives an incoming light (e.g., from an outside environment) and an opposing second side 122 facing the eyes of the user (also facing the base substrate 110). The cover substrate 125 and the base substrate 110 may be disposed at the first side 121 and the second side 122 of the photochromic composition layer 115, respectively. In some embodiments, the cover substrate 125 may include a UV and visible transmissive substrate, such as a fused silica substrate. In some embodiments, the cover substrate 125 may include a first UV filter, which may be a gradient UV filter to further enhance the gradient dimming effect of the photochromic dimming device 100. A gradient UV filter may control the amount of UV light that reaches the photochromic element 105 in a gradient manner (e.g., UV light transmittance gradually increasing) in a direction from a bottom portion to a top portion of the photochromic dimming device 100. The gradient UV filter may be configured to absorb a lesser amount of UV light at an upper portion of the photochromic dimming device 100, and absorb a greater amount of UV light at a lower portion of the photochromic dimming device 100, such that more UV light can reach the upper portion of the photochromic dimming device 100 and the upper portion can become darker, and less UV light can reach the lower portion of the photochromic dimming device 100 and the lower portion can become more transmissive or transparent. In some embodiments, a second UV filter may be disposed between the base substrate 110 and the photochromic composition layer 115 to absorb a UV light transmitted through the photochromic composition layer 115. The base substrate 110 may have a first side facing the photochromic composition layer 115 and an opposing second side. In some embodiments, the photochromic dimming device 100 may include a third UV filter disposed at the second side of the base substrate 110 to absorb a UV light transmitted through the photochromic composition layer 115 and the base substrate 110. The second and/or third UV filers may or may not be a gradient UV filter. In some embodiments, the photochromic dimming device 100 may include at least one of the first UV filter, the second UV filter, or the third UV filter.

The gradient UV filter may include a UV-blocking, UV-absorbing, and/or UV-reflecting coating. The coating may change thickness across the photochromic dimming device 100 from one direction to another (e.g., in the top-bottom direction). For example, the gradient UV filter may include a solid wedge shape including a UV-blocking, UV-absorbing, and/or UV-reflecting material that is thicker at the bottom and gradually becomes thinner toward the top. In some embodiments, the gradient UV filter may include a layer of UV-blocking, UV-absorbing, and/or UV-reflecting dye that becomes more sparsely distributed in a direction from the top to the bottom.

Figure 2A:
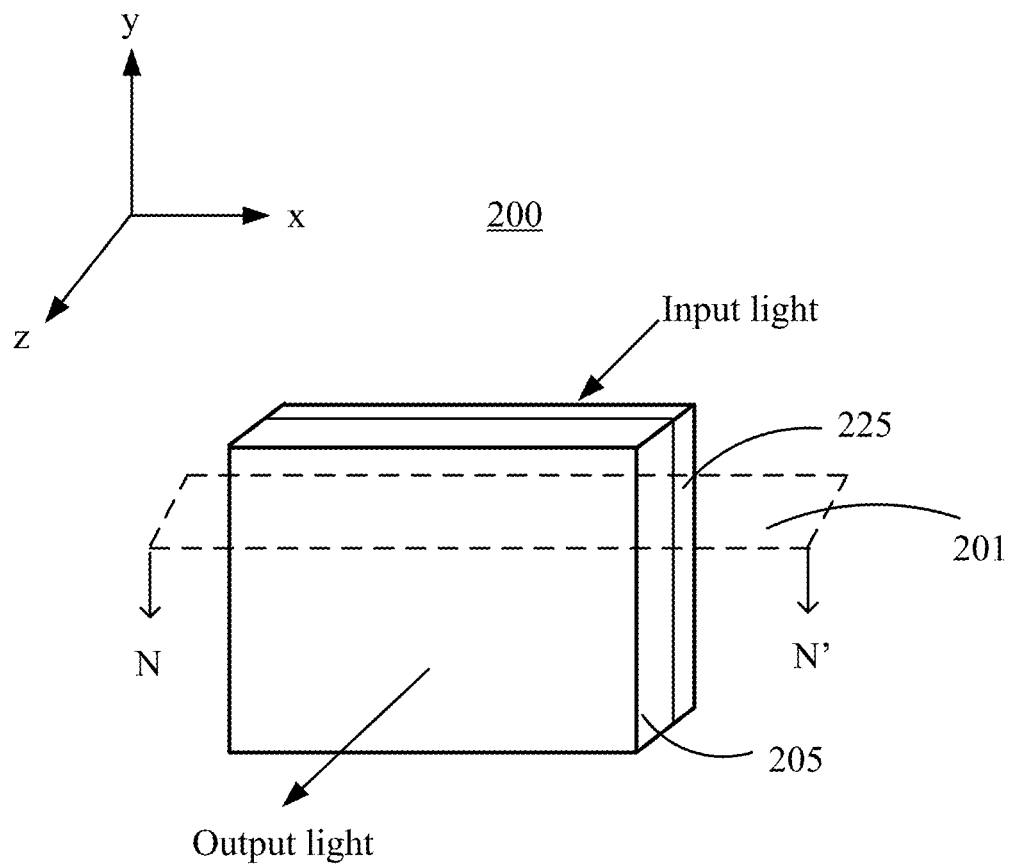
FIG. 2A illustrates a schematic perspective view of a photochromic dimming device, according to another embodiment of the present disclosure.
Figure 2B:
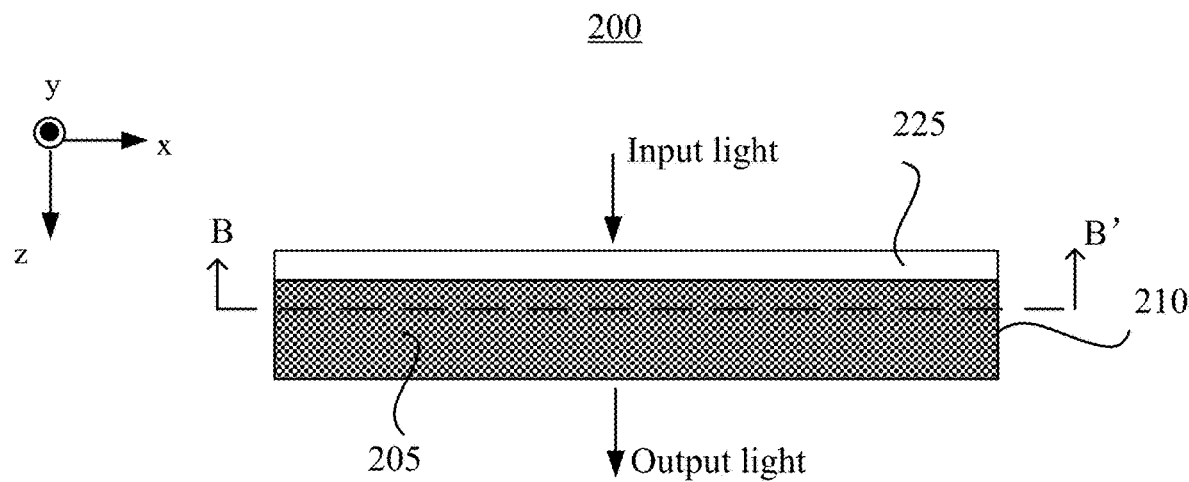
FIG. 2B illustrates a schematic cross-sectional view of the photochromic dimming device shown in FIG. 2A, according to an embodiment of the present disclosure.

FIG. 2A illustrates a schematic perspective view of a photochromic dimming device 200, according to another embodiment of the present disclosure. FIG. 2B illustrates a schematic cross-sectional view of the photochromic dimming device 100, taken along the plane 201 in the direction indicated by the N-N' line, as shown in FIG. 2A. The photochromic dimming device 200 may include elements that are the same as or similar to those included in the photochromic dimming device 100 shown in FIGS. 1A-1C. Detailed descriptions of the same or similar elements may refer to the above descriptions rendered in connection with FIGS. 1A-1C.

As shown in FIG. 2A, the photochromic dimming device 200 may include a photochromic element 205, which may include a photochromic composition integrally disposed within a main body 210 (shown in FIG. 2B) of the photochromic element 205, instead of being provided as a separate film, layer, or plate at a surface of the main body 210 (as shown in FIG. 1B). The photochromic composition may be similar to or the same as the photochromic composition described above. For example, the photochromic composition may include a combination of two or more photochromic materials having different dark steady-state absorption effects or profiles within a predetermined wavelength range, e.g., a visible wavelength range. The photochromic materials may include photochromic compounds (e.g., photochromic dyes), inorganic materials containing photochromic moieties with reversible structural changes, organic materials (e.g., liquid crystals, polymers, etc.) containing photochromic moieties with reversible structural changes, or a combination thereof.

The photochromic element 205 may be obtained through various methods disclosed herein. For example, in some embodiments, a method may involve heating an optical substrate (e.g., a glass substrate, a plastic substrate, etc.) coated with a film including a photochromic composition so as to transfer the photochromic composition into the optical substrate. For example, the photochromic element 205 may have a glass or plastic main body 210, and the photochromic composition may be transferred to be at least partially dispersed within the main body 210. In some embodiments, another method may involve mixing a photochromic composition with polymerizable monomers, casting the mixture in a mold, and polymerizing the mixture to form the photochromic element 205. For example, the main body 210 of the photochromic element 205 may have a polymer network, and the photochromic composition may be at least partially dispersed within the polymer network.

The photochromic element 205 may be rigid, semi-rigid, soft, flexible, or semi-flexible. The photochromic element 205 may have one or more flat surfaces and/or one or more curved surfaces. In some embodiments, the photochromic element 205 may be a part of another optical device or a part of another optoelectrical device. For example, the photochromic element 205 may be a part of a functional device, such as a display screen. In some embodiments, the photochromic element 205 may be a part of an optical lens assembly, such as a lens substrate of the optical lens assembly.

Figure 2C:
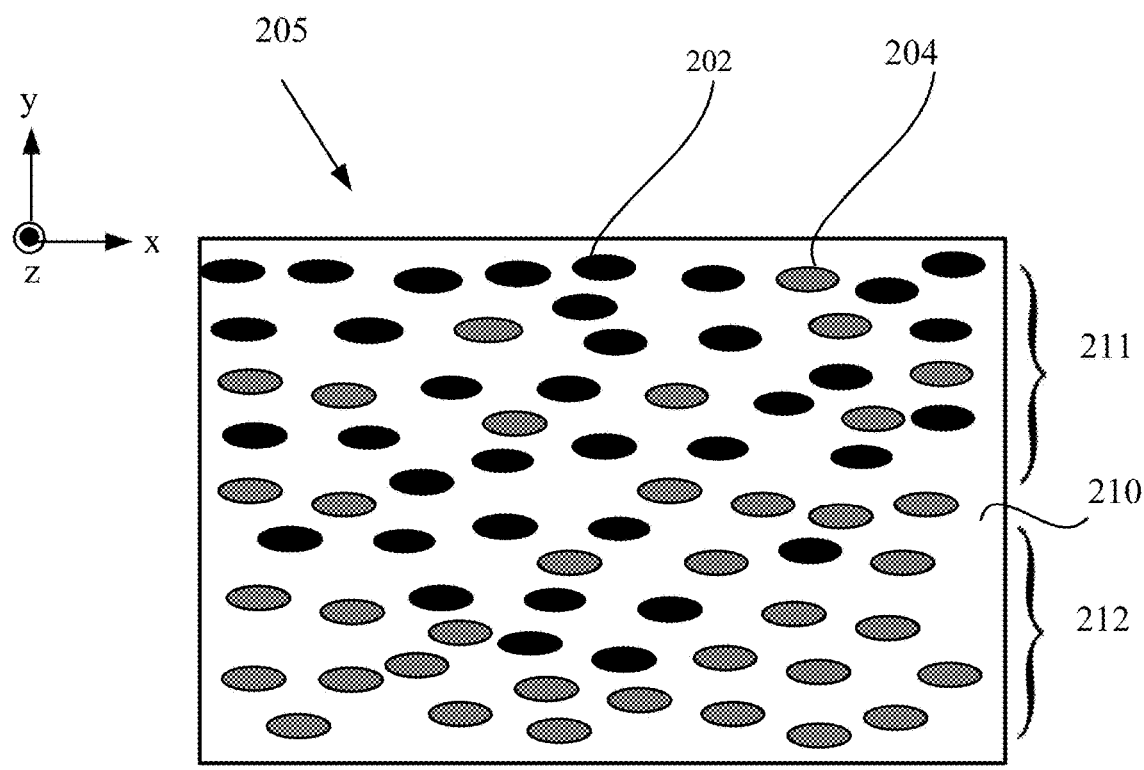
FIG. 2C illustrates a schematic cross-sectional view of a photochromic element included in the photochromic dimming device, taken along the B-B' line, as shown in FIG. 2B, according to an embodiment of the present disclosure.

FIG. 2C illustrates a schematic cross-sectional view of the photochromic element 205 included in the photochromic dimming device 200, taken along the B-B' line in FIG. 2B, according to an embodiment of the present disclosure. Various configurations depicted in FIG. 1C-1E also apply to the photochromic element 205. For the simplicity of illustration, only the embodiment in which the photochromic composition included in the photochromic element 205 may include a combination of a first photochromic material 202 and a second photochromic material 204 having different dark steady-state absorption effects or profiles is shown in FIG. 2C, which is similar to the embodiment shown in FIG. 1C. The first photochromic material 202 and the second photochromic material 204 may be similar to the first photochromic material 102 and the second photochromic material 104 described above in connection with FIG. 1C. Detailed descriptions of the first photochromic material 202 and the second photochromic material 204 may refer to the above descriptions of the first photochromic material 102 and the second photochromic material 104. As shown in FIG. 2C, the first photochromic material 202 and the second photochromic material 204 may be at least partially disposed within the main body 210 of the photochromic element 205. In other words, the photochromic composition may be at least partially integrally disposed within the main body 210 of the photochromic element 205, rather than being provided as a separate layer at a surface of the main body 210.

The main body 210 of the photochromic element 205 may include one or more suitable transparent glass materials or organic materials. In some embodiments, the organic materials may include one or more thermoset materials, one or more thermoplastic materials, or a combination thereof. In some embodiments, the one or more organic materials may include polycarbonate, polyamide, polyimide, polysulfone, copolymers of poly(ethylene terephtalate) and polycarbonate, polyolefines, polynorbornene, epoxy polymers and copolymers, episulfide polymers and copolymers, homopolymers and copolymers of allyl esters, (meth)acrylic polymers and copolymers, homopolymers and copolymers of diethyleneglycol bis(allylcarbonate), polymers and copolymers of (meth)acrylic derivatives with bisphenol-A, thio (meth)acrylic polymers and copolymers, polyurethane and polythiourethane homopolymers and copolymers, or a combination thereof.

In some embodiments, the first photochromic material 202 at the dark steady-state may have a higher absorption effect for at least a visible light than the second photochromic material 204 at the dark steady-state. That is, the first photochromic material 202 may visually appear darker than the second photochromic material 204 when subject to a substantially same UV irradiation. The photochromic element 205 may have a first portion 211 (e.g., an upper portion 211 shown in in FIG. 2C in the vertical direction, i.e., the y-axis direction) and a second portion 212 (e.g., a lower portion 212 in FIG. 2C in the vertical direction, i.e., the y-axis direction) that are located at opposite ends of the photochromic element 205. The concentration of the first photochromic material 202 in the photochromic composition may change in a gradient manner in a predetermined direction, such as from the first portion 211 to the second portion 212 of the photochromic element 205, which may be similar to that of the first photochromic material 102, as shown in FIG. 1C. The concentration of the second photochromic material 204 in the photochromic composition may change in a gradient manner in the predetermined direction, such as from the first portion 211 to the second portion 212 of the photochromic element 205, which may be similar to that of the second photochromic material 104, as shown in FIG. 1C. Descriptions of the similar gradient manners of the concentration change may refer to the above descriptions rendered in connection with FIG. 1C.

Thus, from the first portion 211 to the second portion 212 of the photochromic element 205, the absorption effect of the photochromic element 205 for at least a visible light may gradually decrease from a highest absorption effect to a lowest absorption effect (the lowest absorption effect may be substantially zero). Accordingly, the dimming effect of the photochromic dimming device 200 for at least a visible light may change in a gradient manner from a strongest dimming effect at the first portion 211 of the photochromic element 205 to a weakest dimming effect at the second portion 212 of the photochromic element 205. That is, in the predetermined direction from the first portion 211 to the second portion 212 of the photochromic element 205, the dimming effect of the photochromic dimming device 200 may gradually decrease, while the light transmittance of the photochromic dimming device 200 may gradually increase.

In some embodiments, the gradient concentration distributions of the first photochromic material 202 and the second photochromic material 204 within the photochromic element 205 may also result in different color tints and/or switching time behaviors (between the dark steady state and clear steady state) at the first portion 211 and at the second portion 212 of the photochromic element 205, in addition to the light transmittance or light absorption difference. For example, in some embodiments, the first portion 211 may be darker than the second portion 212. In some embodiments, a speed of switching the first portion 211 from the dark steady state to the clear steady state (or from the clear steady state to the dark steady state) may be faster than a speed of switching the second portion 212 from the dark steady state to the clear steady state (or from the clear steady state to the dark steady state). In some embodiments, a speed of switching the first portion 211 from the dark steady state to the clear steady state (or from the clear steady state to the dark steady state) may be slower than a speed of switching the second portion 212 from the dark steady state to the clear steady state (or from the clear steady state to the dark steady state). In some embodiments, a speed of switching the first portion 211 from the clear steady state to the dark steady state may be faster than a speed of switching the second portion 212 from the clear steady state to the dark steady state, and a speed of switching the first portion 211 from the dark steady state to the clear steady state may be slower than a speed of switching the second portion 212 from the dark steady state to the clear steady state. For example, when a user moves from indoor to outdoor, the upper portion (e.g., first portion 211) of a lens having the photochromic dimming device 200 may transition from the clear steady state to the dark steady state at a faster speed than the lower portion (e.g., second portion 212), such that the upper portion may provide shading for the eyes of the user relatively quickly, while the lower portion still allows the light to transmit therethrough to enable the user to observe the surrounding environment. When the user moves from outdoor to indoor, the lower portion (e.g., second portion 212) may transition from the dark state to the clear state in a speed that is faster than the upper portion (e.g., first portion 211) to allow the user to observe the surrounding environment. In some embodiments, the first portion 211 and the second portion 212 of the photochromic element 205 may correspond to an upper portion and a lower portion of the photochromic dimming device 200, respectively. When a user of the photochromic dimming device 200 places or wears the photochromic dimming device 200 in front of one or two eyes of the user, the photochromic dimming device 200 may shield the one or two eyes of the user from bright overhead sunlight or a bright overhead light source at the upper portion, while allowing more light to transmit through the lower portion of the photochromic dimming device 200.

FIG. 2C shows that the first photochromic material 202 and the second photochromic material 204 may be mixed together throughout the entire photochromic element 205. In some embodiments, the first photochromic material 202 and the second photochromic material 204 may not be mixed throughout the entire photochromic element 205. Instead, the photochromic material 202 and the second photochromic material 204 may be separately distributed in different portions, similar to the embodiment shown in FIG. 1D. For example, the first photochromic material 202 having a higher steady-state absorption effect or profile may be disposed at the first portion 211 (e.g., a higher portion in the vertical direction) and the second photochromic material 204 having a lower steady-state absorption effect or profile may be disposed at the second portion 212 (e.g., a lower portion in the vertical direction). The distribution of the first photochromic material 202 and the second photochromic material 204 in each portion may be uniform or non-uniform. In some embodiments, the first portion 211 may include the first photochromic material 202 uniformly distributed to provide a constant absorption effect across the vertical direction. In some embodiments, the first portion 211 may include the first photochromic material 202 distributed non-uniformly (e.g., distributed in a gradient manner from top to bottom) to provide a gradient absorption effect. For example, the distribution density may have a gradient variation from top to bottom within the first portion 211 to provide a gradient absorption effect. Likewise, the second portion 212 may include the second photochromic material 204 distributed non-uniformly (e.g., distributed in a gradient manner from top to bottom) to provide a gradient absorption effect. For example, the distribution density may have a gradient variation from top to bottom within the second portion 212 to provide a gradient absorption effect.

In some embodiments, the photochromic element 205 may include three or more portions, similar to the embodiment shown in FIG. 1E. The first portion 211 (e.g., top or upper portion) may include the first photochromic material 202, the second portion 212 (e.g., bottom or lower portion) may include the second photochromic material 204, and a third portion (e.g., middle portion, similar to the third portion 113) may include a mixture of the first photochromic material 202 and the second photochromic material 204. The mixture may include a gradient absorption effect or profile in the vertical direction. For example, the top portion 211 having the first photochromic material 202 may provide a relatively high absorption effect, and the bottom portion 212 having the second photochromic material 204 may provide a relatively low absorption effect. The middle portion may have a suitable mixture of the first photochromic material 202 and the second photochromic material 204 to provide a gradient absorption effect, gradually decreasing from a high absorption effect at the interface with the top portion 211 to a low absorption effect at the interface with the bottom portion 212.

In some embodiments, more than two (e.g., three, four, five, six, etc.) photochromic materials having different steady-state absorption effects or profiles may be separately disposed at more than two (e.g., three, four, five, six, etc.) portions of the photochromic element 205 in the vertical direction (e.g., the y-axis direction). At least one portion (e.g., each portion) of the first portion 211, the second portion 212, and other additional portions may include a specific photochromic material having a constant steady-state absorption effect or profile. For example, in the three portion configuration described above, instead of including a mixture of the first photochromic material 202 and the second photochromic material 204 in the middle portion, the middle portion may include a third photochromic material different from the first photochromic material 202 or the second photochromic material 204. The constant steady-state absorption effects or profiles across different portions may gradually change from top to bottom in the vertical direction (e.g., from higher constant steady-state absorption effect to lower constant steady-state absorption effect) of the photochromic element 205. In some embodiments, at least one portion (e.g., each portion) may include a gradient steady-state absorption effect or profile. The gradient steady-state absorption effect or profile in the at least one portion (e.g., each portion) may be provided by a single photochromic material having a gradient density distribution, or by a mixture of two or more photochromic materials having a gradient absorption effect or profile. Other configurations for providing the gradient steady-state absorption effect or profile may be used in the at least one portion (e.g., each portion). The manners (or configurations) through which the gradient steady-state absorption effect or profile is provide in different portions may be different. The gradient steady-state absorption effects or profiles of across different portions may provide an overall gradual change in the absorption effect from the top to the bottom of the photochromic element 205 in the vertical direction.

In some embodiments, the first portion 211 may include the first photochromic material 202 configured in a suitable manner to provide a gradient absorption effect within the first portion in the vertical direction. The second portion 212 may include the second photochromic material 204 configured in a suitable manner to provide a gradient absorption effect within the second portion in the vertical direction. The third portion (e.g., middle portion between the first portion 211 and the second portion 212) may include a third photochromic material configured in a suitable manner to provide a gradient absorption effect within the third portion in the vertical direction.

In some embodiments, the photochromic dimming device 200 may also include other elements. For example, referring to FIG. 2B, the photochromic dimming device 200 may also include a cover substrate 225, which may be similar to the cover substrate 125 described above. The photochromic element 205 may have a first side that receives an incoming light (e.g., from an outside environment) and an opposing second side facing an eye of a user. The cover substrate 225 may be disposed at the first side of the photochromic element 205. In some embodiments, the cover substrate 225 may include a UV and visible transmissive substrate, such as a fused silica substrate. In some embodiments, the cover substrate 225 may include a first UV filter, which may be a gradient UV filter to further enhance the gradient dimming effect of the photochromic dimming device 200. A gradient UV filter may control the amount of UV light that reaches the photochromic element 205 in a gradient manner (e.g., UV light transmittance gradually increasing) in a direction from a bottom portion to a top portion of the photochromic dimming device 200. The gradient UV filter may be configured to absorb a lesser amount of UV light at an upper portion of the photochromic dimming device 200, and absorb a greater amount of UV light at a lower portion of the photochromic dimming device 200, such that more UV light can reach the upper portion of the photochromic dimming device 200 and the upper portion can become darker, and less UV light can reach the lower portion of the photochromic dimming device 200 and the lower portion can become more transmissive or transparent. Other aspects of the gradient UV filter can refer to the above descriptions. In some embodiments, the photochromic element 205 may include a second UV filter disposed at the second side of the photochromic element 205 to absorb a UV light transmitted through the photochromic element 205. The second UV filter may or may not be a gradient UV filter. In some embodiments, the photochromic dimming device 200 may include at least one of the first UV filter or the second UV filter.

Figure 3A:
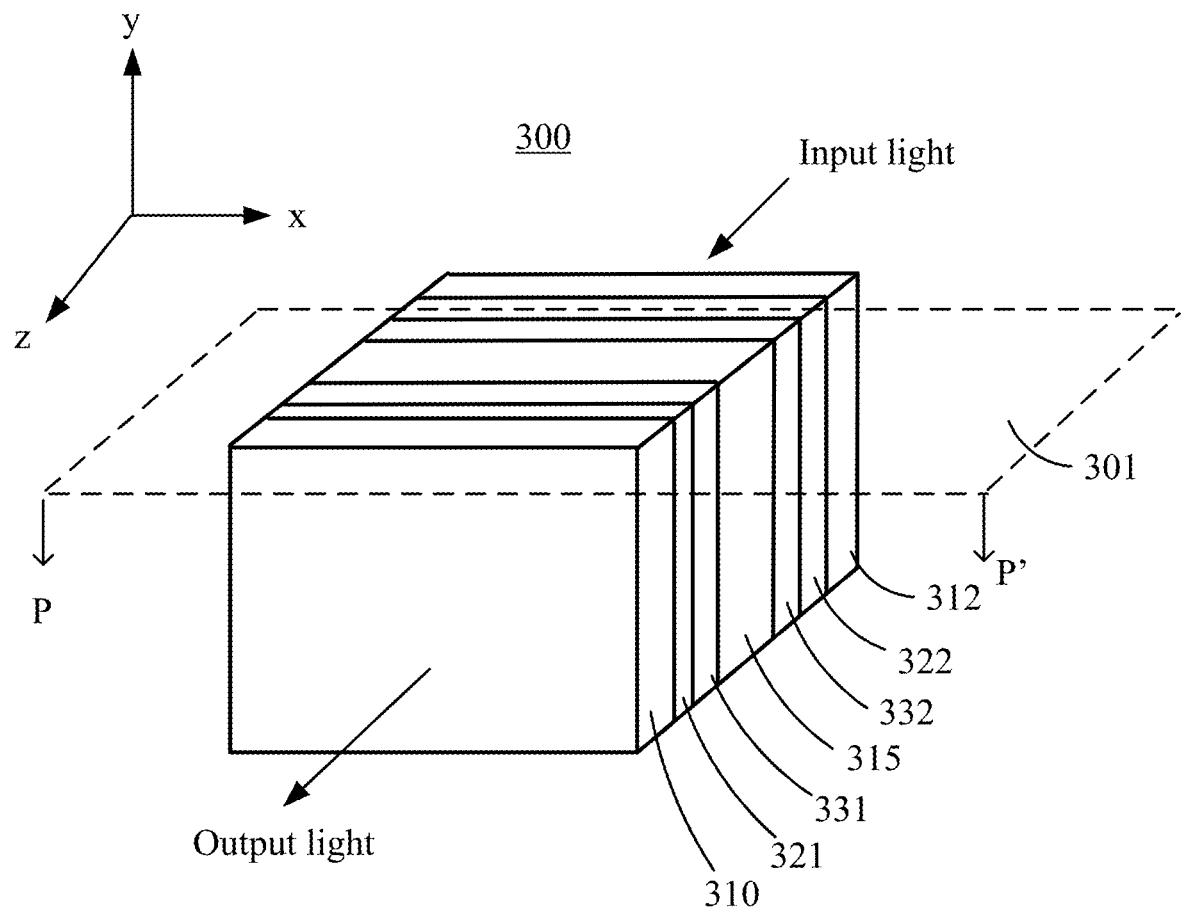
FIG. 3A illustrates a schematic perspective view of a photochromic dimming device, according to another embodiment of the present disclosure.
Figure 3B:
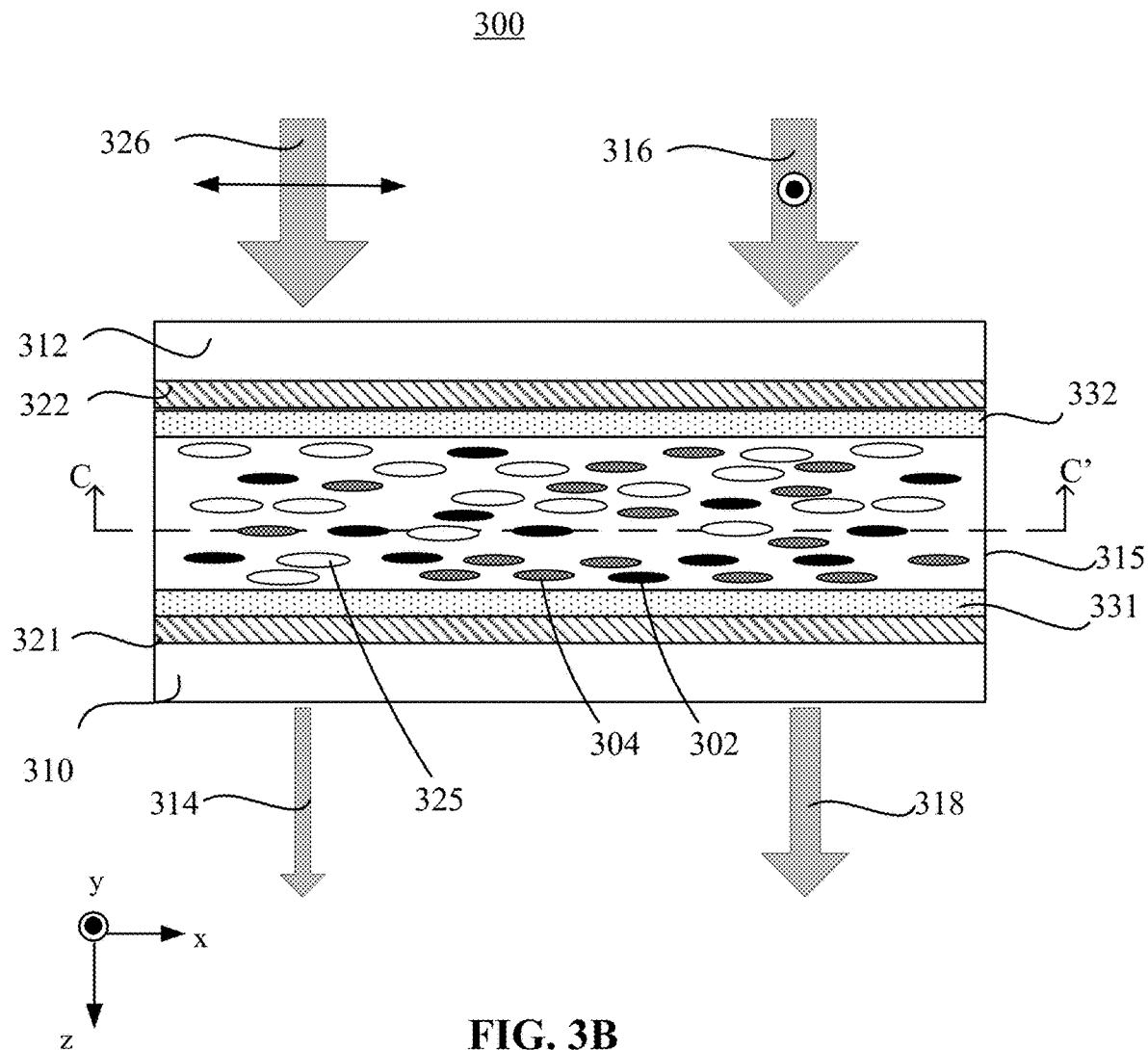
FIG. 3B illustrates a schematic cross-sectional view of the photochromic dimming device shown in FIG. 3A, according to an embodiment of the present disclosure.

FIG. 3A schematically illustrates a perspective view of a photochromic dimming device 300, according to another embodiment of the present disclosure. FIG. 3B is a schematic cross-sectional view of the photochromic dimming device 300 taken alone a plane 301 in a direction indicated by the P-P' line, as shown in FIG. 3A. As shown in FIG. 3A, the photochromic dimming device 300 may include a photochromic composition. The photochromic dimming device 300 may include a lower base substrate 310, an upper base substrate 312 arranged opposite to the lower base substrate 310, and a photochromic element 315 in the form of a photochromic composition layer sandwiched between the upper base substrate 312 and the lower base substrate 310.

As shown in FIG. 3A and FIG. 3B, the photochromic element 315 may include the photochromic composition described above. In some embodiments, the photochromic dimming device 300 may also include two electrodes 321 and 322 disposed at opposing surfaces of the lower base substrate 310 and the upper base substrate 312. The two electrodes 321 and 322 may sandwich the photochromic element 315. The photochromic dimming device 300 may also include at least one alignment structure. For example, the photochromic dimming device 300 may include a first alignment structure 331 and a second alignment structure 332 disposed at opposing surfaces of the electrodes 321 and 322. The first alignment structure 331 and the second alignment structure 332 may sandwich the photochromic element 315. Each of the first alignment structure 331 and the second alignment structure 332 may be in contact with the photochromic composition included in the photochromic element 315.

Figure 3C:
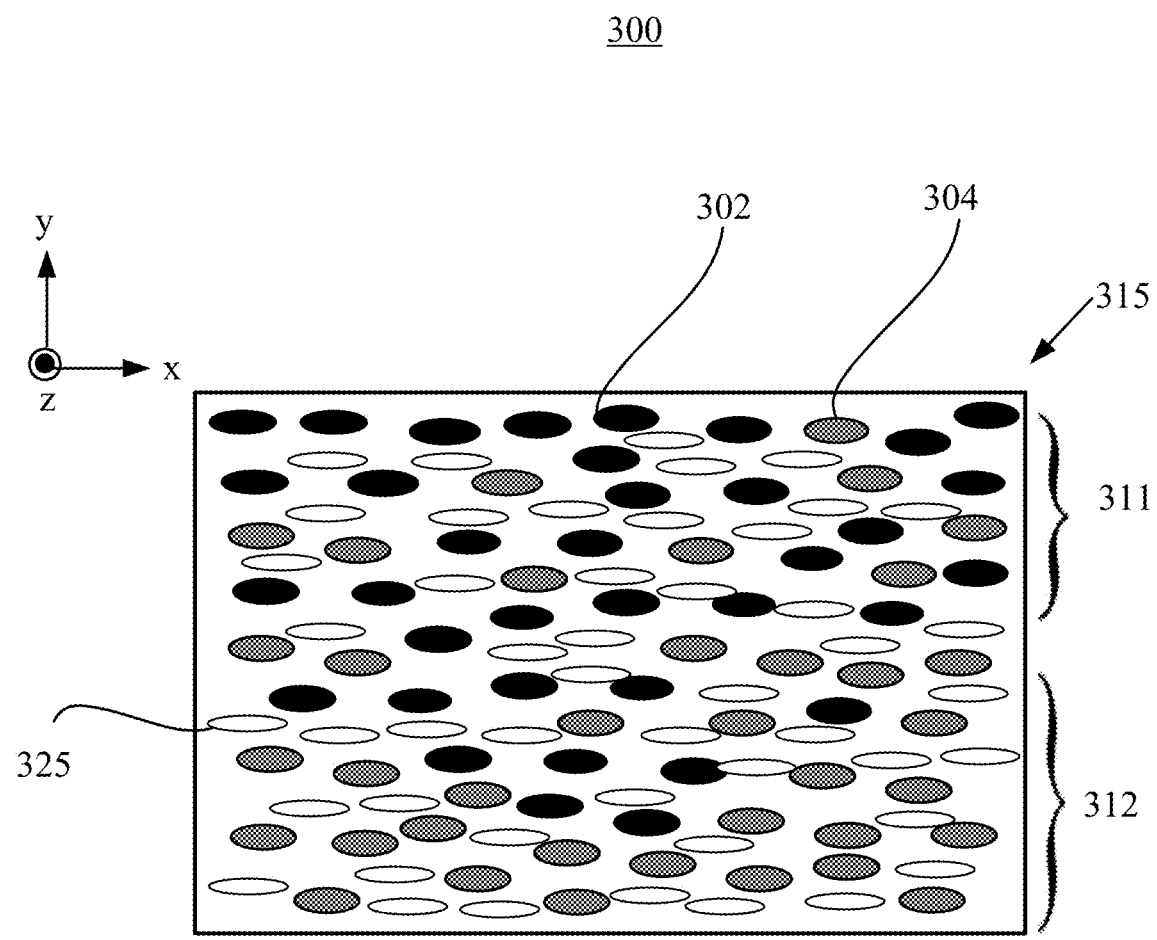
FIG. 3C illustrates a schematic cross-sectional view of a photochromic composition layer included in the photochromic dimming device, taken along the C-C' line, as shown in FIG. 3A, according to an embodiment of the present disclosure.

FIG. 3C is a schematic illustration of a cross-sectional view of the photochromic element 315, taken along the C-C' line as shown in FIG. 3B. In some embodiments, the photochromic composition included in the photochromic element 315 may be similar to the photochromic composition described above. For example, as shown in FIG. 3C, the photochromic composition included in the photochromic element 315 may include one or more host materials (or base materials) 325 doped with a plurality of photochromic materials (e.g., a first photochromic material 302 and a second photochromic material 304) having different steady-state absorption effects or profiles. In some embodiments, the host materials 325 may include liquid crystal ("LC") materials. For discussion purposes, the host materials 325 may also be referred to as LC materials 325. For the sake of simplicity of description, the reference number 325 is also used for LC molecules of the LC material 325 in the following description.

The first photochromic material 302 and the second photochromic material 304 may have different steady-state absorption effects or profiles. LC molecules 325 may be aligned in a predetermined alignment pattern. The LC molecules 325 may be aligned via any suitable methods. In some embodiments, the first alignment layer 331 disposed adjacent the lower base substrate 310 and the second alignment layer 332 disposed adjacent the upper substrate 312 may be configured to at least partially align the LC molecules 325 in the predetermined alignment pattern. In some embodiments, the alignment structures 331 and 332 may be in a form of, e.g., an alignment layer, or an alignment nanostructure, etc.

In some embodiments, at least one of the first alignment structure 331 or the second alignment structure 332 may be omitted. For example, in some embodiments, the LC molecules 325 may be aligned by an external field, e.g., a light field, an electric field, or a magnetic field, etc. Accordingly, one or both of the first alignment structure 331 and the second alignment structure 332 may be omitted. In some embodiments, the LC molecules 325 may include polarization-sensitive functional groups, which may be aligned under a polarized light irradiation.

In some embodiments, the photochromic materials (including the first photochromic material 302 and the second photochromic material 304) may be aligned with the LC molecules 325 (e.g., molecules of the photochromic materials may be aligned with the LC molecules 325) and may exhibit strong dichroism. For example, the photochromic materials (e.g., 302, 304) at the dark steady-state may absorb one of two plane-polarized components of a light more strongly than the other. Such photochromic materials may also be referred to as dichroic-photochromic materials. In some embodiments, the dichroic-photochromic materials may include organic molecules that have an anisotropic absorption, which may depend on an orientation of the organic molecules of the photochromic materials relative to a polarization direction of an incoming light (e.g., an incoming visible light). In some embodiments, the dichroic-photochromic materials may strongly absorb an incoming light that is polarized parallel to an absorption axis (e.g., a long axis or a short axis) of the organic molecules, and weakly absorb an incoming light that is polarized perpendicular to an absorption axis (e.g., a long axis or a short axis) of the organic dichroic-photochromic molecules. A dichroic-photochromic material having the absorption axis in the long axis of the organic molecules may be referred to as a positive dichroic-photochromic material, and a dichroic-photochromic material having the absorption axis in the short axis of the organic molecules may be referred to as a negative dichroic-photochromic material.

In some embodiments, the LC molecules 325 may be uniformly distributed across the photochromic element 315. As shown in FIG. 3C, the photochromic composition may include the host materials 325 (e.g., LC molecules 325) doped with a combination of the first photochromic material 302 and the second photochromic material 304. The first photochromic material 302 at the dark steady-state may have a higher absorption for at least a visible light than the second photochromic material 304 at the dark steady-state.

As shown in FIG. 3C, the photochromic element 315 may have a first portion 311 (e.g., an upper portion 311 shown in FIG. 3C in the vertical direction, i.e., the y-axis direction) and a second portion 312 (e.g., a lower portion 312 shown in FIG. 3C in the vertical direction, i.e., the y-axis direction) that are located at opposite ends of the photochromic element 315. The concentration of the first photochromic material 302 in the combination may change in a gradient manner in the predetermined direction of the photochromic element 315, such as from the first portion 311 to the second portion 312 of the photochromic element 315, which may be similar to that of the first photochromic material 102 described above in connection with FIG. 1C. The concentration of the second photochromic material 304 in the photochromic composition may change in a gradient manner from the first portion 311 to the second portion 312 of the photochromic element 315, which may be similar to that of the second photochromic material 104 described above in connection with FIG. 1C. Descriptions relating to the gradient manner of the concentration changing may refer to the above descriptions rendered in connection with FIG. 1C. Thus, from the first portion 311 to the second portion 312 of the photochromic element 315, the absorption effect of the photochromic element 315 for at least a visible light may gradually decrease from a highest absorption effect to a lowest absorption effect (the lowest absorption effect may be substantially zero). Accordingly, the dimming effect of the photochromic dimming device 300 for at least a visible light may change in a gradient manner from a strongest dimming effect to a weakest dimming effect in a direction from a first portion of the photochromic dimming device 300 (corresponding to the first portion 311 of the photochromic element 315) to a second portion of the photochromic dimming device 300 (corresponding to the second portion 312 of the photochromic element 315). That is, in a direction from the first portion to the second portion of the photochromic dimming device 300, the dimming effect of the photochromic dimming device 300 may gradually decrease, while the light transmittance of the photochromic dimming device 300 may gradually increase.

In some embodiments, the first portion 311 and the second portion 312 of the photochromic element 315 may correspond to an upper portion and a lower portion of the photochromic dimming device 300, respectively. When a user of the photochromic dimming device 300 places or wears the photochromic dimming device 300 in front of one or two eyes of the user, the photochromic dimming device 300 may shield the eyes of the user from bright overhead sunlight or a bright overhead light source at the upper portion, while allowing more light to transmit through the lower portion of the photochromic dimming device 300.

Although not shown, in some embodiments, the photochromic materials included in the photochromic dimming device 300 may have configurations shown in FIG. 1D and FIG. 1E. Other possible configurations described above with respect to the photochromic dimming device 100 may also apply to the photochromic dimming device 300. For example, in some embodiments, the first portion 311 may include the first photochromic material 302, and the second portion 312 may include the second photochromic material 304, similar to the embodiment shown in FIG. 1D. In at least one portion (e.g., each portion), the absorption effect may be constant (e.g., the corresponding photochromic material may be uniformly distributed in the vertical direction). In some embodiments, in at least one portion (e.g., each portion), the absorption effect may have a gradient profile (e.g., the corresponding photochromic material may be non-uniformly distributed in the vertical direction).

In some embodiments, the photochromic dimming device 300 may include one or more portions in addition to the first portion 311 and the second portion 312. For example, there may be a middle portion between the first portion 311 and the second portion 312. The first portion 311 may include the first photochromic material 302 and the second portion may include the second photochromic material 304. The middle portion may include a mixture of the first photochromic material 302 and the second photochromic material 304. The absorption effect may gradually decrease from the top portion to the bottom portion of the photochromic dimming device 300.

In some embodiments, in the configuration including three or more portions, each portion may include an individual photochromic material. For example, the first portion 311 may include the first photochromic material 302, the second portion 312 may include the second photochromic material 304. The middle portion may include a third photochromic material that is different from the first photochromic material 302 or the second photochromic material 304. Other possible configurations can refer to the above descriptions provided in connection with FIG. 1C-FIG. 1E.

Returning to FIG. 3B, the gradient dimming effect of the photochromic dimming device 300 may be polarization dependent. For example, the dimming effect (or the light attenuation effect) of the photochromic dimming device 300 may be stronger for an incoming light (e.g., at least a visible light) polarized in a first direction than for an incoming light polarized in a second direction perpendicular to the first direction. That is, the photochromic dimming device 300 may visually appear darker for an incoming light polarized in the first direction than for an incoming light polarized in the second direction. For illustrative purposes, in FIG. 3B, the LC materials 325 may have positive dielectric anisotropy, i.e., the LC molecules 325 may be positive LCs, and may be homogeneously aligned, e.g., in an x-axis. Accordingly, the molecules of the dichroic-photochromic materials (including the first photochromic material 302 and the second photochromic material 304) may be aligned with the LC molecules 325, e.g., in the x-axis. The dichroic-photochromic materials (including the first photochromic material 302 and the second photochromic material 304) may be positive dichroic-photochromic dyes where the absorption axis is the long axis (e.g., the x-axis) of the molecules of the dichroic-photochromic materials. Thus, the photochromic dimming device 300 may exhibit a stronger dimming effect (or a stronger light attenuation effect) for a first incoming light 326 polarized in a first direction (e.g., an x-direction as indicated by the arrow in FIG. 3B) than for a second incoming light 316 polarized in a second direction (e.g., a y-direction as indicated by the circled black dot in FIG. 3B) perpendicular to the first direction. That is, the photochromic dimming device 300 may have a smaller light transmittance for the first incoming light 326 than for the second incoming light 316. The first incoming light 326 and the second incoming light 316 may be transmitted through the photochromic dimming device 300 as a first output light 314 and a second output light 318, respectively. Provided that the light intensity of the first incoming light 326 and the second incoming light 316 are substantially the same, the first output light 314 may have a lower light intensity than the second output light 318.

In some embodiments, the LC materials 325 may include passive LCs (e.g., reactive mesogens, LC polymers, etc.). Accordingly, the photochromic dimming device 300 may function as a passive dimming device. In some embodiments, the LC molecules 325 may include active LCs, which may be reorientable via an external field, e.g., an external electric field generated between electrodes 321 and 322 included in the photochromic dimming device 300. When the active LCs are reoriented via the electric field, the orientations of the organic molecules of the dichroic-photochromic materials (including the first photochromic material 302 and the second photochromic material 304) may also change along with the LC molecules 325, resulting in a change in the orientations of the absorption axes of the molecules of the dichroic-photochromic materials. Accordingly, the light transmittance of the photochromic dimming device 300 may be changed, and the photochromic dimming device 300 may function as an active device with controllable light transmittance.

Figure 3D:
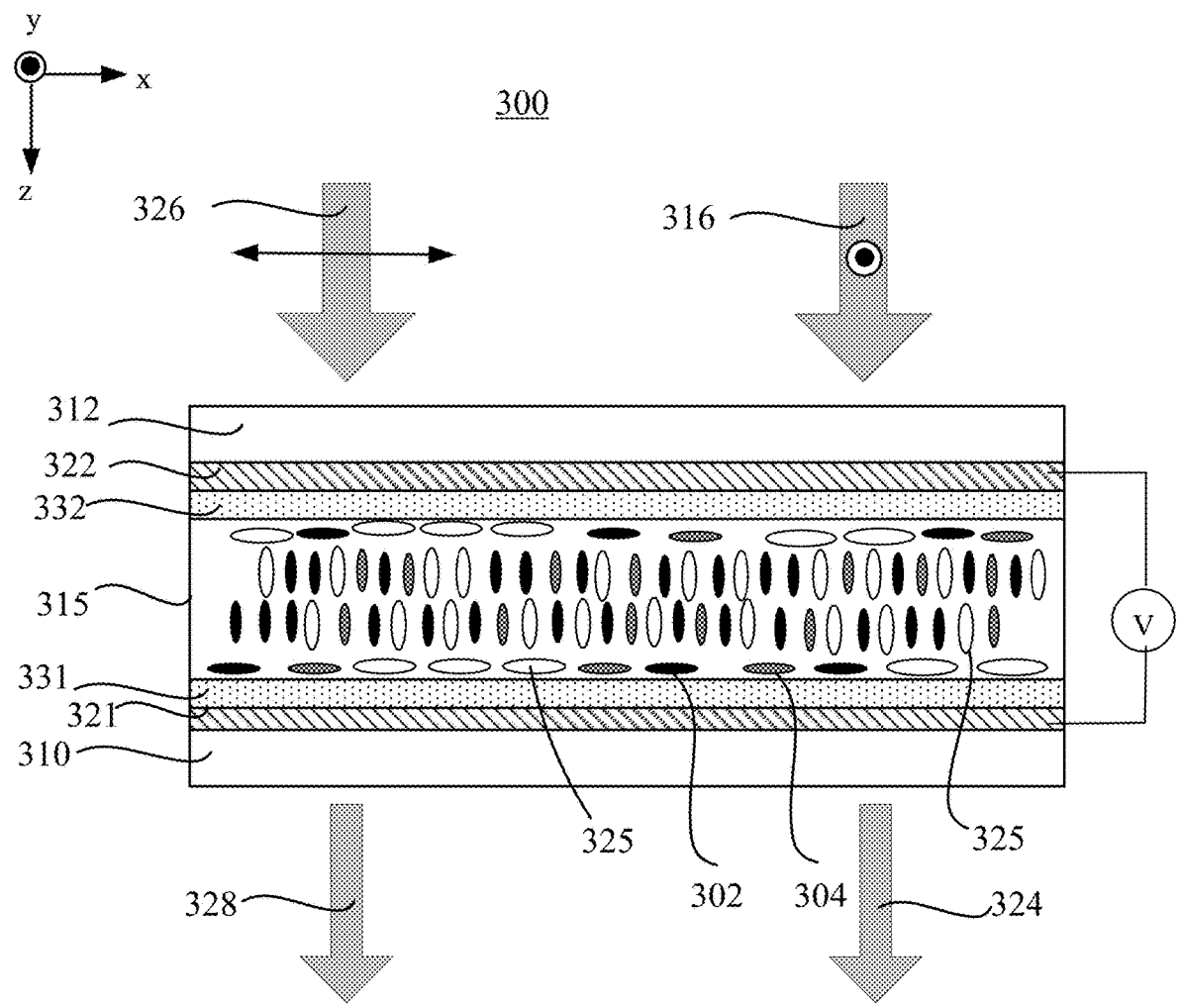
FIG. 3D illustrates a schematic cross-sectional view of the photochromic dimming device shown in FIG. 3B at a voltage-on state, according to an embodiment of the present disclosure.

In some embodiments, as shown in FIG. 3D, the electrode 322 included in the photochromic dimming device 300 may be an upper electrode disposed at a surface of the upper base substrate 312, and the electrode 321 may be a lower electrode disposed at a surface of the lower base substrate 310. The electrode 321 may be disposed between the substrate 310 and the alignment structure (e.g., alignment layer) 331, and the electrode 322 may be disposed between the substrate 312 and the alignment structure 332. In some embodiments, the upper electrode 322 and the lower electrode 321 may be planar electrodes. When a voltage is applied to the upper electrode 322 and the lower electrode 321, a vertical electric field may be generated across the photochromic element 315. When the generated electric field is sufficiently high, the LC molecules 325 may be reoriented by the generated electric field, and may trend to be aligned in a direction of the generated electric field, e.g., in the z-axis direction, as shown in FIG. 3C. When the LC molecules 325 are reoriented, the molecules of the photochromic materials 302 and 304 may be aligned in the same direction as the adjacent LC molecules 325, resulting in an reorientation of the absorption axes of the molecules of the dichroic-photochromic materials (including the first photochromic material 302 and the second photochromic material 304). For example, comparing FIG. 3B and FIG. 3D, the molecules of the dichroic-photochromic materials (including 302 and 304) may be reoriented from a strongly-absorbing/planar orientation (shown in FIG. 3B) to a weakly-absorbing/perpendicular orientation (shown in FIG. 3D).

Referring to FIG. 3D, the first incoming light 326 may be transmitted through the photochromic dimming device 300 as a third output light 328. Referring to FIG. 3B and FIG. 3D, for the first incoming light 326 polarized in the x-direction, the photochromic dimming device 300 at a voltage-on state (e.g., under a voltage higher than a threshold voltage associated with the photochromic element 315) as shown in FIG. 3D may exhibit a weaker dimming effect or a weaker absorption effect than at a voltage-off state (e.g., under a voltage lower than the threshold voltage associated with the photochromic element 315) as shown in FIG. 3B. Thus, the third output light 328 shown in FIG. 3D may have a higher light intensity than the first output light 314 shown in FIG. 3B. In addition, referring to FIG. 3D, the second incoming light 316 may be transmitted through the photochromic dimming device 300 as a fourth output light 324. Presuming that the light intensities of the first incoming light 326 and the second incoming light 316 are substantially the same, and the applied voltage is sufficient high to reorient the LC molecules 325 substantially along the electric field direction, then the third output light 328 and the fourth output light 324 may have a substantially same light intensity. That is, the photochromic dimming device 300 at the voltage-on state may exhibit a substantially same dimming effect for the first incoming light 326 and the second incoming light 316 polarized in orthogonal directions. In other words, when the applied voltage is sufficiently high to reorient the LC molecules 325 substantially along the electric field direction, the photochromic dimming device 300 may be polarization independent.

Thus, through configuring the concentration distributions of the first photochromic material 302 (e.g., first dichroic-photochromic dye) and the second photochromic material 304 (e.g., second dichroic-photochromic dye) in the photochromic element 315, the photochromic dimming device 300 may provide a gradient dimming effect for at least a visible light, for example, in a predetermined direction from an upper portion of the photochromic dimming device 300 to a lower portion of the photochromic dimming device 300. In addition, through controlling the reorientations of the first photochromic material 302 (e.g., first dichroic-photochromic dye) and the second photochromic material 304 (e.g., second dichroic-photochromic dye) within the voltage-controllable LC cell or the photochromic element 315, the photochromic dimming device 300 may function as an active dimming device to provide a tunable dimming effect. For example, through adjusting a voltage applied to the photochromic dimming device 300, the photochromic dimming device 300 may be switched between a high absorption colored state, an intermediate absorption colored state, a low absorption colored state, and a clear state for at least a visible light that is polarized in a first direction, such as the first incoming light 326 polarized in a direction parallel to the absorption axis of the molecules of the photochromic materials 302 and 304 when the photochromic dimming device 300 is at the voltage-off state.

In FIG. 3B and FIG. 3D, the upper electrode 322 and the lower electrode 321 may be planar electrodes disposed in different substrates to realize an out-of-plane reorientation of the LC molecules 325. In some embodiments, at least one of the upper electrode 322 or the lower electrode 321 may be a patterned electrode. In some electrodes, the photochromic dimming device 300 may include two electrodes disposed at the same substrate to realize an in-plane reorientation of the LC molecules 325. For example, the two electrodes may include a planar electrode and a patterned electrode (e.g., a plurality of striped interleaved electrodes arranged in parallel). An electrically insulating layer may be disposed between the two electrodes. A voltage may be applied to the two electrodes to generate a horizontal electric field (e.g., in the x-axis direction) across the photochromic element 315 to reorient the LC molecules 325.

Figure 4A:
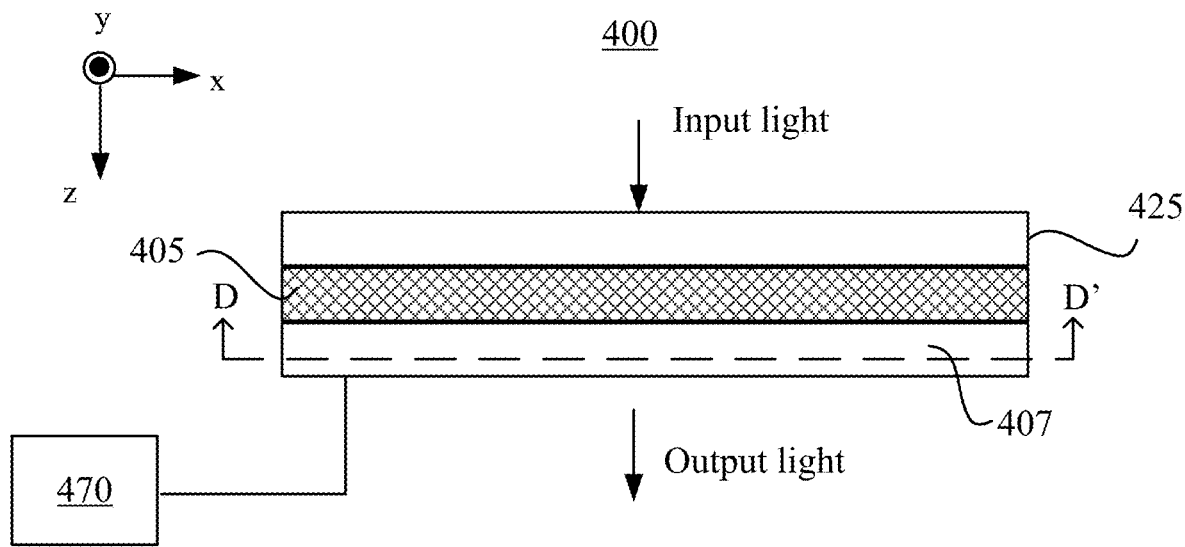
FIG. 4A illustrates a schematic cross-sectional view of a photochromic dimming device, according to another embodiment of the present disclosure.

FIG. 4A illustrates a schematic cross-sectional view of a photochromic dimming device 400, according to another embodiment of the present disclosure. The photochromic dimming device 400 shown in FIG. 4A may include elements that are the same as or similar to those included in the photochromic dimming device 100 shown in FIG. 1B, the photochromic dimming device 200 shown in FIG. 2B, or the photochromic dimming device 300 shown in FIG. 3B. Detailed descriptions of the similar elements may refer to the above descriptions rendered in connection with FIG. 1A-3D. As shown in FIG. 4A, the photochromic dimming device 400 may include a photochromic element 405 and a heating element 407 coupled to the photochromic element 405. The photochromic element 405 may include a photochromic composition distributed substantially uniformly within the photochromic element 405. In some embodiments, the photochromic composition may be provided in a form of a separate layer, film, or plate at a surface of a base substrate, similar to the embodiment shown in FIG. 1B. In some embodiments, the photochromic composition may be at least partially integrally disposed within a main body of the photochromic element 405, similar to the embodiment shown in FIG. 2B.

The photochromic composition of the photochromic element 405 may include one or more thermally-reversible photochromic materials. The light absorption effect of the thermally-reversible photochromic materials at the dark steady-state for at least a visible light may vary with a temperature of the thermally-reversible photochromic materials. In some embodiments, the light absorption effect of thermally-reversible photochromic materials at the dark steady-state for at least a visible light may decrease as the temperature of the thermally-reversible photochromic materials at the steady-state increases. In some embodiments, the light absorption effect of the thermally-reversible photochromic materials at the dark steady-state may increase as the temperature of the thermally-reversible photochromic materials at the steady-state increases.

The heating element 407 may be configured to provide a gradient temperature for the photochromic element 405 from a first portion of the photochromic element 405 to a second portion of the photochromic element 405, thereby realizing a gradient light absorption effect from the first portion to the second portion (and hence the gradient photochromic dimming effect from the first portion to the second portion). The heating element 407 may be any suitable heating element. In some embodiments, the heating element 407 may include a resistive heating element, such as a resistive wire. In some embodiments, the resistive heating element may generate heat based on the phenomena of joule heating. When an electrical current passes through the resistive heating element, heat may be generated due to the resistive nature of the resistive heating element. In some embodiments, the heating element 407 may be visually or optically transparent. For example, the heating element 407 may be optically transparent to lights at least in the visible spectrum (e.g., about 380 nm to about 700 nm).

In some embodiments, the heating element 407 may include two opposite sheets of, for example, glass or clear plastic (e.g., polycarbonate, acrylic, or polyester), and a conductive material sandwiched between the two opposite sheets. The conductive material may have sufficient electrical conductivity and optical transparency. In some embodiments, the heating element 407 may include resistive wires having a substantially small diameter (e.g., about 25 micrometers). In some embodiments, the resistive wires may be disposed in a pattern between two sheets of, for example, polyester. In some embodiments, the resistive wires may be disposed in a pattern across a transparent surface of the heating element 407.

The photochromic element 405 may have a first side where an incoming light (e.g., from an outside environment) is received and an opposing second side facing an eye of a user, where the light is output from the photochromic element 405. The heating element 407 may be disposed at (e.g., on) the first side or the second side of the photochromic element 405. For illustrative purposes, FIG. 4A shows that the heating element 407 may be disposed at the second side of the photochromic element 405. The photochromic dimming device 400 may also include other elements. In some embodiments, the photochromic dimming device 400 may also include a cover substrate 425, which may be disposed at the first side of the photochromic element 405. Although FIG. 4A shows that the cover substrate 425 and the heating element 407 are disposed at different sides of the photochromic element 405, in some embodiments, the cover substrate 425 and the heating element 407 may be disposed at the same side of the photochromic element 405. In some embodiments, when the cover substrate 425 and the heating element 407 are disposed at the same side of the photochromic element 405, the cover substrate 425 may be disposed at a side of the heating element 407 facing the outside environment. In other words, the heating element 407 may be disposed between the photochromic element 405 and the cover substrate 425. In some embodiments, the cover substrate 425 may include a gradient UV filter to further enhance the gradient dimming effect of the photochromic dimming device 400. The gradient UV filter may be configured to absorb a lesser amount of UV light at an upper portion of the photochromic dimming device 400, and absorb a greater amount of UV light at a lower portion of the photochromic dimming device 400, such that more UV light can reach the upper portion of the photochromic dimming device 400 and the upper portion can become darker, and less UV light can reach the lower portion of the photochromic dimming device 400 and the lower portion can be more transmissive or transparent. In some embodiments, the cover substrate 425 may include a UV and visible transmissive substrate, such as a fused silica substrate.

Figure 4B:
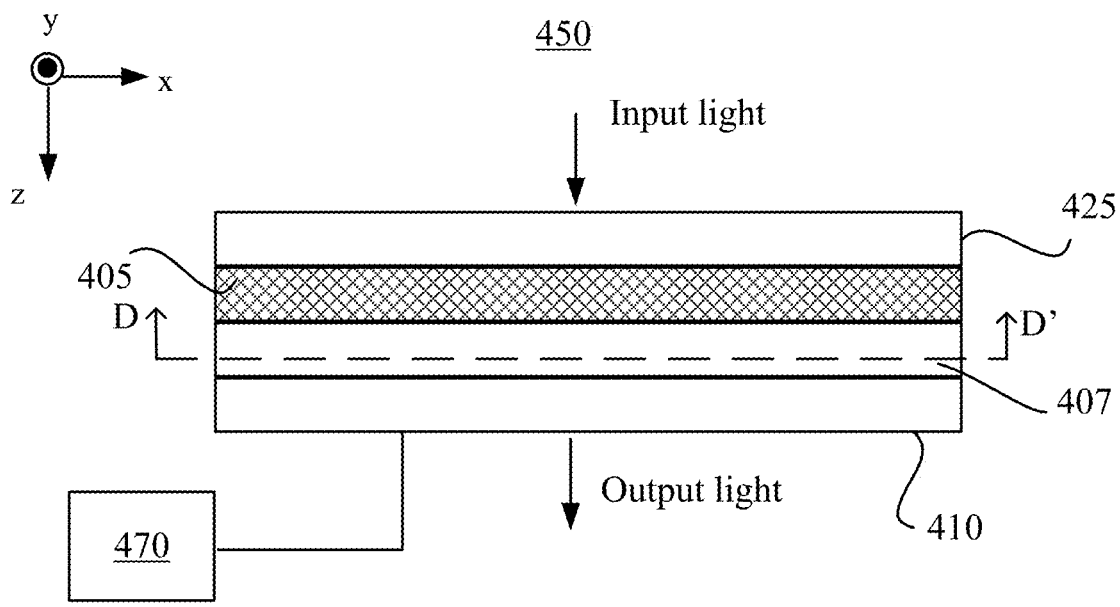
FIG. 4B illustrates a schematic cross-sectional view of a photochromic dimming device, according to another embodiment of the present disclosure.

FIG. 4B illustrates a schematic cross-sectional view of a photochromic dimming device 450. The photochromic dimming device 450 may include elements that are the same as or similar to those included in the photochromic dimming device 400. The descriptions of the similar or the same elements included in the photochromic dimming device 450 can refer to the above descriptions rendered in connection with FIG. 4A. As shown in FIG. 4B, the photochromic dimming device 450 may include a base substrate 410. The photochromic element 405 and the heating element 407 may be disposed between the base substrate 410 and the cover substrate 425. The base substrate 410 may be disposed at a surface of the heating element 407, at the opposite side of the photochromic element 405. In some embodiments, the heating element 407 may be provided as a separate element at a surface of the base structure 410. In some embodiments, the heating element 407 may be provided as an integral part of the base structure 410. For example, heating units (shown in FIG. 4C) of the heating element 407 may be integrally provided at least partially inside the base structure 410.

Figure 4C:
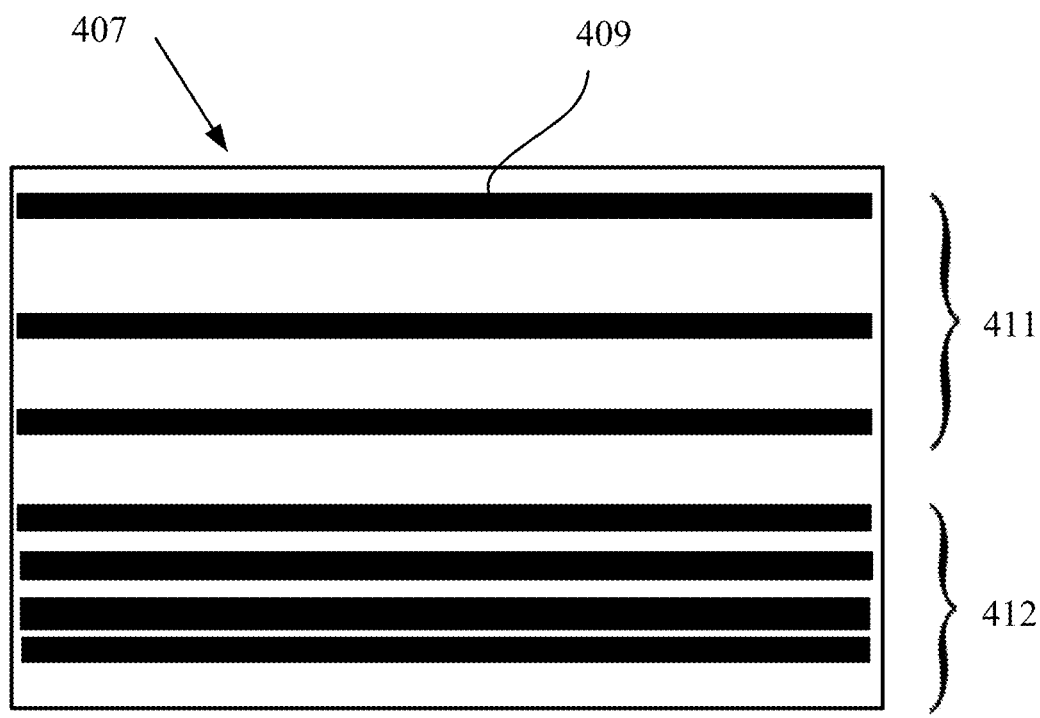
FIG. 4C illustrates a schematic cross-sectional view of a heating element included in the photochromic dimming device, taken along the D-D' line, as shown in FIG. 4A or FIG. 4B, according to an embodiment of the present disclosure.
Figure 4C:
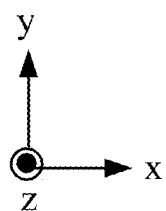

FIG. 4C illustrates a schematic cross-sectional review of the heating element 407 included in the photochromic dimming device 400 shown in FIG. 4A or the photochromic dimming device 450 shown in FIG. 4B, taken along the D-D' line as shown in FIG. 4A and FIG. 4B. As shown in FIG. 4C, the heating element 407 may have a first portion 411 (e.g., an upper portion 411 in the vertical direction, i.e., the y-axis direction) and a second portion 412 (e.g., a lower portion 412 in the vertical direction, i.e., the y-axis direction) that are located at opposite ends of the heating element 407. The heating element 407 may be configured to generate a gradient heat distribution from the first portion 411 to the second portion 412 of the heating element 407.

In the embodiment shown in FIG. 4C, the photochromic element 405 may have a first portion (or an upper portion) corresponding to the first portion 411 of the heating element 407 and a second portion (or a lower portion) corresponding to the second portion 412 of the heating element 407, which are located at opposite ends of the photochromic element 405. The gradient heat distribution from the first portion 411 of the heating element 407 to the second portion 412 of the heating element 407 may cause a gradient temperature distribution from the first portion of the photochromic element 405 to the second portion of the photochromic element 405. The gradient temperature distribution in the photochromic element 405 may cause a gradient absorption effect (and hence a gradient dimming effect) in the photochromic composition included in the photochromic element 405 from the first portion of the photochromic element 405 to the second portion of the photochromic element 405. In other words, the dimming effect caused by the photochromic composition may result in a stronger dimming effect in the upper portion of the photochromic element 405 (or an upper portion of the photochromic dimming device 400 or 450) and a weaker dimming effect in a lower portion of the photochromic element 405 (or a lower portion of the photochromic dimming device 400 or 450). From the upper portion of the photochromic element 405 to the lower portion of the photochromic element 405, the dimming effect may gradually decrease (e.g., in a gradient manner).

In some embodiments, when the thermally-reversible photochromic materials at the dark steady-state have a lower absorption effect at a higher temperature and a higher absorption effect at a lower temperature (e.g., when the absorption increases as the temperature decreases), the gradient heat distribution generated by the heating element 407 may be configured to increase from the first portion 411 to the second portion 412 of the heating element 407. Thus, the temperature of the photochromic composition included in the photochromic element 405 may increase along a direction from the first portion 411 to the second portion 412 of the heating element 407 in a gradient manner. Accordingly, the dimming effect of the photochromic dimming device 400 or 450 for an incoming light within the predetermined wavelength range may change in a gradient manner from a strongest dimming effect to a weakest dimming effect in a direction from the first portion 411 of the heating element 407 to the second portion 412 of the heating element 407. That is, the dimming effect of the photochromic dimming device 400 or 450 may gradually decrease in a direction from a first portion (e.g., an upper portion) of the photochromic dimming device 400 or 450 (corresponding to the first portion 411 of the heating element 407) to a second portion (e.g., a lower portion) of the photochromic dimming device 400 or 450 (corresponding to the second portion 412 of the heating element 407). When a user places or wears the photochromic dimming device 400 or 450 in front of one or two eyes of the user, the photochromic dimming device 400 or 450 may shield the eyes of the user from bright overhead sunlight or a bright overhead light source at the upper portion, while allowing more light to transmit through the lower portion of the photochromic dimming device 400 or 450.

In some embodiments, when the thermally-reversible photochromic materials at the dark steady-state have a higher absorption effect at a higher temperature and a lower absorption effect at a lower temperature (e.g., when the absorption decreases as the temperature decreases), the gradient heat distribution generated by the heating element 407 may be configured to decrease from the first portion 411 to the second portion 412 of the heating element 407. Thus, the temperature of the photochromic composition included in the photochromic element 405 may decrease along a direction from the first portion 411 to the second portion 412 of the heating element 407 in a gradient manner. Accordingly, the dimming effect of the photochromic dimming device 400 or 450 for an incoming light within the predetermined wavelength range may change in a gradient manner from a strongest dimming effect to a weakest dimming effect in a direction from the first portion 411 of the heating element 407 to the second portion 412 of the heating element 407. That is, the dimming effect of the photochromic dimming device 400 or 450 may gradually decrease in a direction from a first portion (e.g., an upper portion) of the photochromic dimming device 400 or 450 (corresponding to the first portion 411 of the heating element 407) to a second portion (e.g., a lower portion) of the photochromic dimming device 400 or 450 (corresponding to the second portion 412 of the heating element 407). When a user places or wears the photochromic dimming device 400 or 450 in front of one or two eyes of the user, the photochromic dimming device 400 or 450 may shield the eyes of the user from bright overhead sunlight or a bright overhead light source at the upper portion, while allowing more light to transmit through the lower portion of the photochromic dimming device 400 or 450.

Referring to FIG. 4C, in some embodiments, the heating element 407 may include a plurality of heating units 409, for example, resistive wires having a substantially small diameter (e.g., about 25 micrometers). A distribution density of the heating units 409 may change (e.g., increase or decrease) from the first portion 411 to the second portion 412 of the heating element 407 in a gradient manner. For discussion purposes, the photochromic composition included in the photochromic element 405 shown in FIG. 4A and the photochromic composition layer 415 shown in FIG. 4B may include thermally-reversible photochromic materials that have a lower steady-state absorption effect at a higher temperature and a higher steady-state absorption effect at a lower temperature. Referring to FIG. 4C, the distribution density of the heating units 409 may be configured to increase from the first portion 411 to the second portion 412 of the heating element 407 in a gradient manner. Thus, heat generated by the heating element 407 may gradually increase from the first portion 411 to the second portion 412 of the heating element 407. Accordingly, the temperature of the photochromic composition included in the photochromic element 405 shown in FIG. 4A and the photochromic composition layer 415 shown in FIG. 4B may gradually increase along a direction from the first portion 411 to the second portion 412 of the photochromic element 405. In some embodiments, the first portion 411 may correspond to an upper portion of the photochromic dimming device 400 or 450, and the second portion 412 may correspond to an lower portion of the photochromic dimming device 400 or 450 when the photochromic dimming device 400 or 450 is disposed in front of an eye of a user. Thus, the light absorption effect of the photochromic dimming device 400 or 450 for at least a visible light may decrease in a gradient manner from a highest light absorption effect to a lowest light absorption effect in a direction from the first portion 411 of the heating device 407 (corresponding to the upper portion of the photochromic dimming device 400 or 450) to second portion 412 of the heating element 407 (corresponding to the lower portion of the photochromic dimming device 400 or 450). Accordingly, the dimming effect of the photochromic dimming device 400 or 450 for at least a visible light may gradually decrease in a direction from the upper portion to the lower portion of the photochromic dimming device 400 or 450.

In some embodiments, embodiments of the heating element 407 (including the embodiment shown in FIG. 4C and variations described above) may be combined with features from the embodiment shown in FIG. 1A-FIG. 1E, the embodiment shown in FIGS. 2A-2C, and/or the embodiment shown in FIG. 3A-FIG. 3D. For example, the various configurations of the photochromic materials shown in FIG. 1C-FIG. 1E, and the variations described above, may be combined with the configuration of the heating element 407 shown in FIG. 4C. In the various combinations, the heating element 407 may have a uniform configuration when the photochromic material distribution may create a gradient absorption effect. In some embodiments, the heating element 407 and the distribution of the photochromic materials may both create a gradient absorption effect. For example, when the photochromic material has a higher absorption effect or switches to a dark steady state faster at a higher temperature, the heating element 407 may have a higher density of the heating units 409 to provide a higher temperature at the upper portion, and a photochromic element or photochromic dimming device coupled with the heating element 407 may include a higher light absorption effect (e.g., by including a higher density of the photochromic material or having a material with a higher absorption effect) at a corresponding upper portion of the photochromic dimming device. In some embodiments, when the photochromic material has a higher absorption effect or switches to a dark steady state faster at a lower temperature, the heating element 407 may have a lower density of the heating units 409 to provide a lower temperature at the upper portion, and the photochromic element or photochromic dimming device coupled with the heating element 407 may include a higher light absorption effect (e.g., by including a higher density of the photochromic material or having a material with a higher absorption effect) at a corresponding upper portion of the photochromic dimming device. That is, the direction of the heating units density gradient (high density to low density corresponding to high temperature to low temperature) in the heating element 407 may be in the same direction as or may be opposite to the direction of the absorption effect gradient (high absorption effect to low absorption effect) of the photochromic material(s) in the photochromic element or dimming device.

In some embodiments, when the photochromic element or photochromic dimming device includes two or more portions, each portion having a photochromic material with a respective constant or gradient absorption effect, the heating element 407 may have corresponding two or more portions, each portion having a predetermined constant or gradient density of the heating units 409 to provide a corresponding constant temperature or temperature gradient for the corresponding portion of the photochromic material. In some embodiments, when the photochromic element or photochromic dimming device includes three or more portions, with a top portion having a first photochromic material with a constant or gradient absorption effect, a bottom portion having a second photochromic material with a constant or gradient absorption effect, and one or more middle portions each having a different mixture of the first photochromic material and the second photochromic material, the heating element 407 may have corresponding three or more portions, each portion having a predetermined constant or gradient density of the heating units 409 to provide a corresponding constant temperature or temperature gradient for the corresponding portion of the photochromic material (e.g., different photochromic materials may have different thermal properties). The uniform or gradient distribution of the heating units 409 in the heating element 407 may be combined with any configuration of the photochromic material disclosed herein.

In various embodiments, the upper portion of the photochromic dimming device may have a greater absorption effect than the lower portion of the photochromic dimming device. In some embodiments, the speed of switching of the photochromic material(s) from the clear state to the dark state in the upper portion may be faster than the speed in the lower portion, and the heating element 407 may provide a higher temperature or a lower temperature at the upper portion, depending on the thermal property of the photochromic material(s) (e.g., depending on whether the material switches faster at the higher temperature or lower temperature). In some embodiments, the speed of switching from the dark state to the clear state may be faster in the lower portion than the speed in the upper portion, and the heating element 407 may provide a higher temperature or a lower temperature at the lower portion, depending on the thermal property of the photochromic material(s) (e.g., depending on whether the material switches faster at the higher temperature or lower temperature).

In some embodiments, the photochromic composition included in the photochromic element 405 shown in FIG. 4A and the photochromic composition layer 415 shown in FIG. 4B may include thermally-reversible photochromic materials that have a higher steady-state absorption effect at a higher temperature and a lower steady-state absorption effect at a lower temperature. Accordingly, the distribution density of the heating units 409 may be configured to decrease from the first portion 411 to the second portion 412 of the heating element 407 in a gradient manner. Thus, the dimming effect of the photochromic dimming device 400 or 450 for at least a visible light may gradually decrease in a direction from the first portion 411 of the heating element 407 (corresponding to the upper portion of the photochromic dimming device 400 or 450) to the second portion 412 of the heating element 407 (corresponding to the lower portion of the photochromic dimming device 400 or 450).

The shape and number of the heating units 409 shown in FIG. 4C, and the distribution of the heating units 409 shown in FIG. 4C are for illustrative purposes. The heating units 409 may have other suitable shapes and/or numbers. The heating units 409 may have other suitable distribution, which may generate a desirable heat gradient from the first portion 411 to the second portion 412 of the heating element 407, thereby realizing a desirable temperature gradient to cause a desirable gradient light absorption effect (and hence a gradient photochromic dimming effect) of the photochromic composition included in the photochromic element 405 or the photochromic composition layer 415, in a direction from the first portion 411 to the second portion 412 (which may correspond to a direction from an upper portion of the photochromic dimming device 400 or 450 to a lower portion of the photochromic dimming device 400 or 450). In some embodiments, the heating units 409 may be uniformly distributed in the heating element 407. Different amounts of electrical energy may be supplied to the heating units 409 to generate a gradient temperature in the heating element 407, which may cause a gradient dimming effect in the photochromic element 405. A controller 470 communicatively coupled with the heating element 407 may be configured to control the amounts of electrical energy supplied to different heating units 409.

Photochromic dimming devices in accordance with an embodiment of the present disclosure may have various applications in a number of fields, which are all within the scope of the present disclosure. Some exemplary applications in augmented reality ("AR"), virtual reality ("VR"), mixed reality ("MR") fields, or any combination thereof will be explained below. Near-eye displays ("NEDs") have been widely used in a large variety of applications, such as aviation, engineering, science, medicine, computer gaming, video, sports, training, and simulations. One application of NEDs is to realize VR, AR, MR, or any combination thereof. An NED may include a display element configured to generate an image light and a lens system configured to direct the image light toward eyes of a user. The lens system may include a plurality of optical elements, such as lenses, waveplates, reflectors, etc., for focusing the image light to the eyes of the user.

In some embodiments, a photochromic dimming device in accordance with an embodiment of the present disclosure may be implemented in an optical device, e.g., an NED, to control a light transmittance of an ambient light (e.g., sunlight, a light emitted from an external light source, etc.) that propagates through the NED to reach one or two eyes of a user of the NED. When the NED is an optically see-through NED for AR and/or MR applications, the disclosed photochromic dimming device may be configured to provide a gradient dimming effect for the ambient light (e.g., a visible ambient light) in a direction from a first portion (e.g., an upper portion) to a second portion (e.g., a lower portion) of the photochromic dimming device. When the user operates or uses the NED (e.g., when the user wears the NED that includes the photochromic dimming device), the photochromic dimming device may shield the eyes of the user from bright overhead sunlight or a bright overhead light source at the upper portion, while allowing more light to transmit through the lower portion of the photochromic dimming device.

Figure 5A:
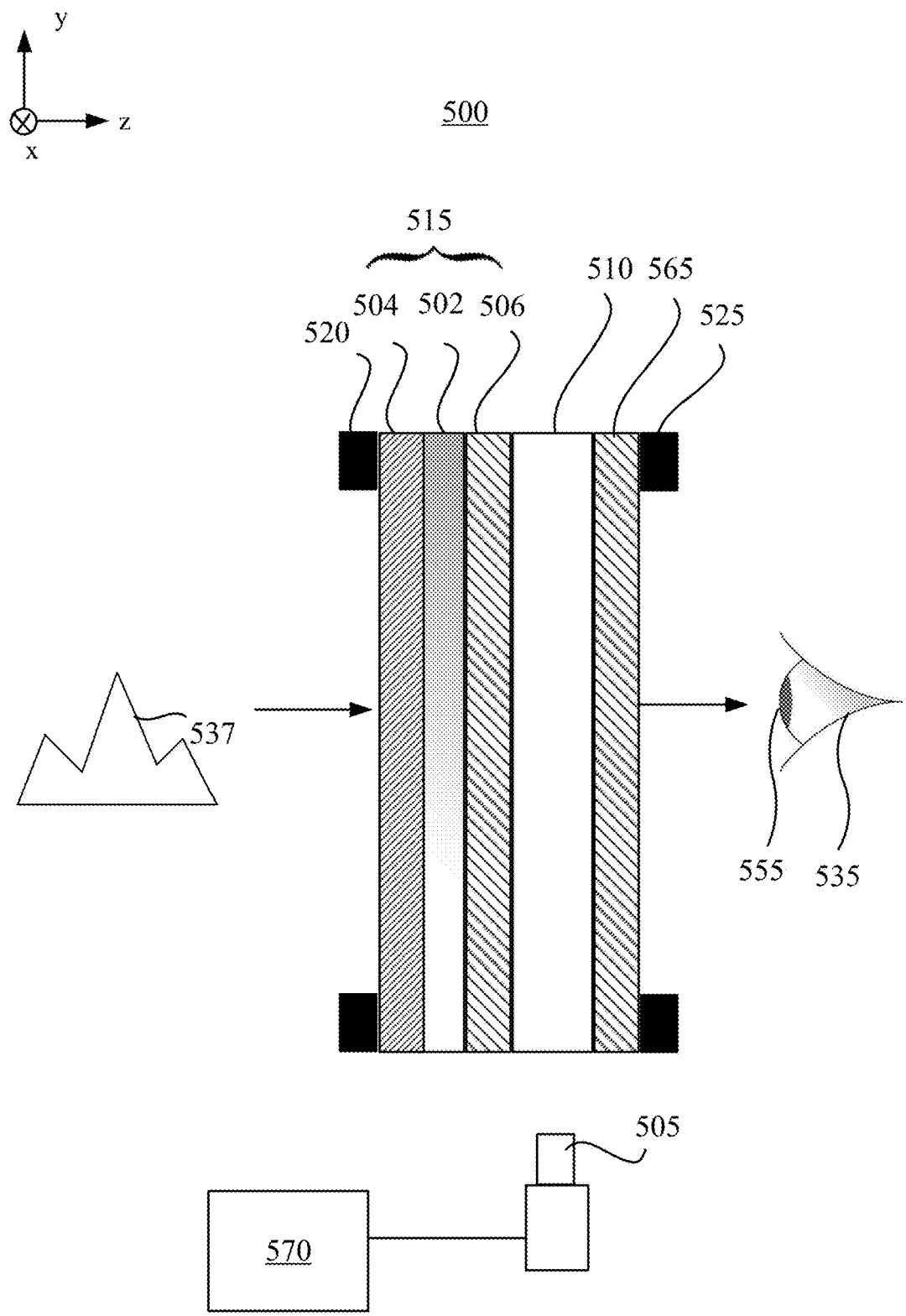
FIG. 5A illustrates a schematic cross-sectional view of an optical assembly, according to an embodiment of the present disclosure.
Figure 5B:
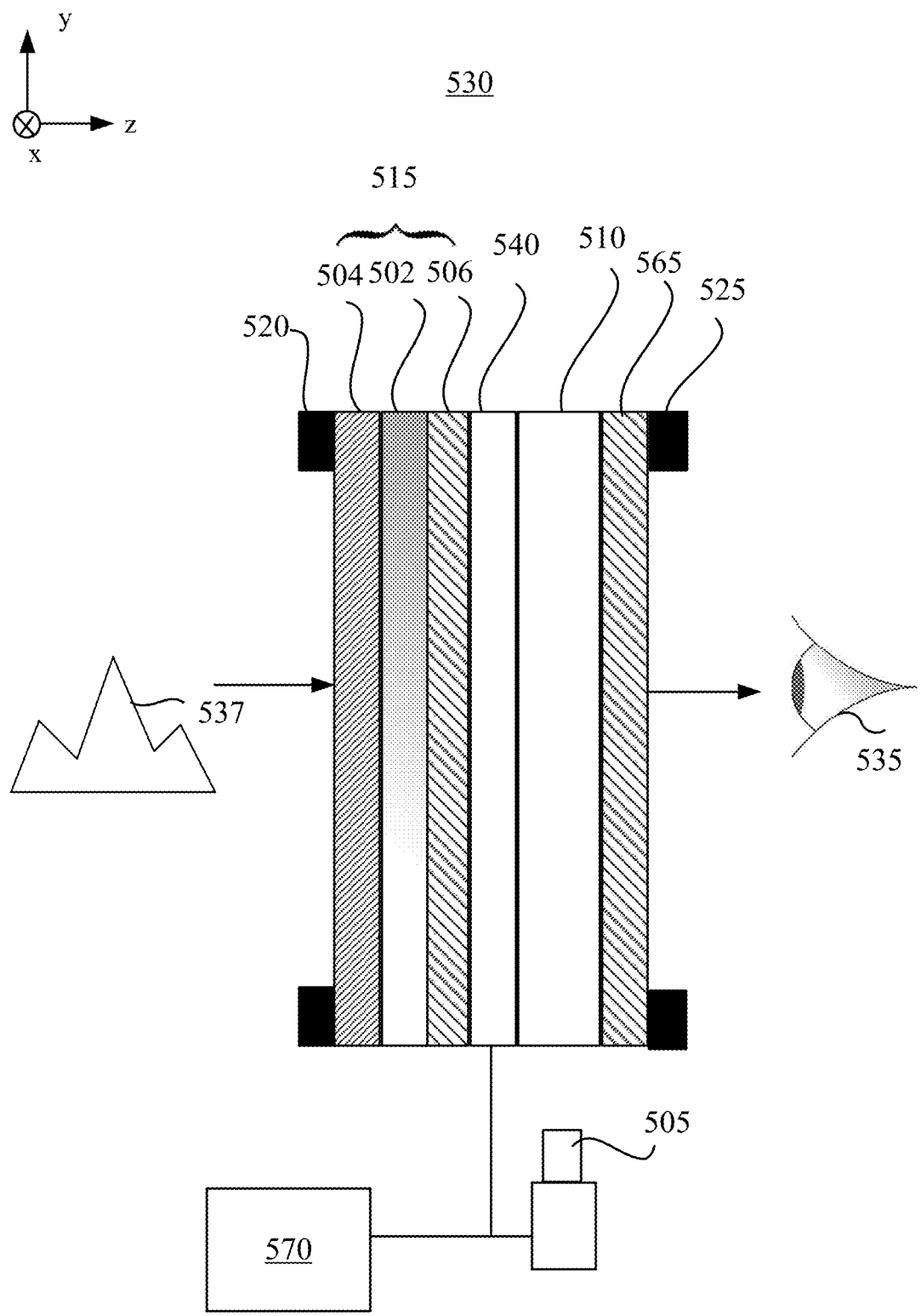
FIG. 5B illustrates a schematic cross-sectional view of an optical assembly, according to another embodiment of the present disclosure.
Figure 5C:
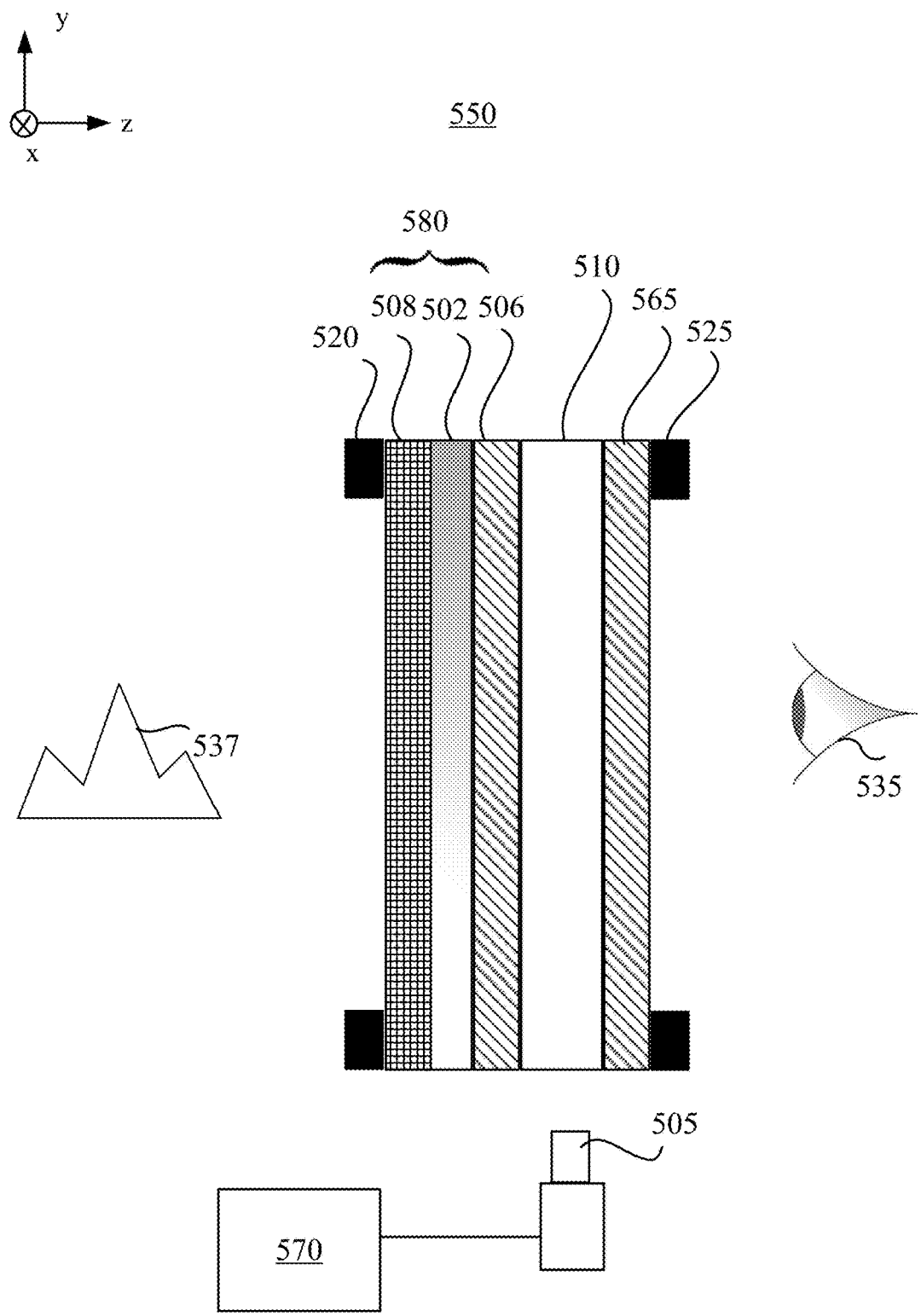
FIG. 5C illustrates a schematic cross-sectional view of an optical assembly, according to another embodiment of the present disclosure.

FIGS. 5A-5C illustrate schematic y-z plane cross-sectional views of optical assemblies, according to various embodiments of the present disclosure. Each of the optical assemblies shown in FIGS. 5A-5C may include a photochromic dimming device in accordance with an embodiment of the present disclosure, such as the photochromic dimming device 100 shown in FIG. 1A, the photochromic dimming device 200 shown in FIG. 2A, the photochromic dimming device 300 shown in FIG. 3A, the photochromic dimming device 400 shown in FIG. 4A, or the photochromic dimming device 450 shown in FIG. 4B. Each of the photochromic dimming devices shown in FIGS. 5A-5C may include a photochromic composition. The photochromic composition may be provided in a form of a separate layer, which may be provided at a surface of a base substrate, similar to the embodiments shown in FIG. 1B, FIG. 3B, and certain embodiments of the photochromic element 405 shown in FIG. 4A and FIG. 4B. Alternatively, the photochromic composition may be integrally provided at least partially within a main body of the base substrate, similar to the embodiment shown in FIG. 2B, and certain embodiments of the photochromic element 405 shown in FIG. 4A and FIG. 4B. In some embodiments, at least one (e.g., each) of the optical assemblies shown in FIGS. 5A-5C may be a component of an NED.

FIG. 5A shows a schematic y-z plane cross-sectional view of an optical assembly 500, which may include a light source assembly 505 (e.g., an electronic display) configured to generate a light or an image light forming, such as an AR image element or an MR image element. The position of the light source assembly 505 shown in FIG. 5A is for illustrative purposes only. The light source assembly 505 may be disposed at any suitable location in the optical assembly 500. The optical assembly 500 may also include an optical combiner 510 configured to receive the AR image element (or the MR image element) and an ambient light from a real world environment (e.g., lights reflected by a mountain 537 shown in FIG. 5A) outside of the optical assembly 500. The optical combiner 510 may be configured to combine the AR image element (or the MR image element) with the ambient light, and output a combined image light to an eye-box of the optical assembly 500. For example, the optical combiner 510 may be configured to generate an AR image having the AR image element (or an MR image having the MR image element) superimposed in the ambient image formed from the ambient light, through combining the AR or MR image element and the ambient light. The optical combiner 510 may also be configured to direct the AR/MR image toward the eye-box of the optical assembly 500. An eye pupil 555 of an eye 535 of a user may be positioned within the eye-box when the user operates or uses the optical assembly 500 (e.g., when the user wears an NED that includes the optical assembly 500).

The optical combiner 510 may include any suitable optically transparent combiner, such as a waveguide combiner, a holographic optical element ("HOE") combiner, a semi-silvered mirror, or a combination thereof. In some embodiments, the optical combiner 510 and the light source assembly 505 may form a transparent display system. The HOE combiner may provide a wide field of view ("FOV"). In some embodiments, the HOE combiner may include a fixed hologram configured to focus a highly off-axis light beam as an on-axis light beam in front of the eye pupil 555. In some embodiments, the HOE combiner may include a volume (or Bragg) hologram, which may include multiple holograms superimposed to provide a high diffraction efficiency at a plurality of wavelengths (e.g., red, green, and blue wavelengths), thereby enabling a multi-color (e.g., a full color) display. In some embodiments, the HOE combiner may include a volume hologram or a Bragg hologram, which may include multiple holograms superimposed to achieve an increased angular spectrum of the HOE combiner.

The optical assembly 500 may also include a photochromic dimming device 515 in accordance with an embodiment of the present disclosure. The photochromic dimming device 515 may be configured to provide a gradient dimming effect to the ambient light in a direction from a first portion (e.g., an upper portion) to a second portion (e.g., a lower portion) of the photochromic dimming device 515, where the first portion and the second portion may be located at opposite ends of the photochromic dimming device 515. In FIG. 5A, the direction from the upper portion to the lower portion is in the −y direction. By providing a gradient dimming effect with a stronger dimming effect at the upper portion and a weaker dimming effect at the lower portion, the photochromic dimming device 515 may shield the eye 535 of the user from bright overhead sunlight or a bright overhead light source at the upper portion, while allowing more light to transmit through the lower portion of the photochromic dimming device 515. In some embodiments, the photochromic dimming device 515 may also be configured to improve viewability (e.g., contrast ratio) of AR/MR image elements (e.g. texts and/or graphs) in the AR/MR image.

In some embodiments, the optical assembly 500 may further include an input aperture 520 through which the ambient light enters the optical assembly 500. The input aperture 520 may be defined by an opening in a housing, or a frame (e.g., an eye frame in a pair of glasses or goggles, a light-transmissive window, or any other suitable structure). In some embodiments, the input aperture 520 may enclose or may be covered by a window, screen, lens, filter, or another optical element. The photochromic dimming device 515 may be disposed between the input aperture 520 and the optical combiner 510. In some embodiments, the photochromic dimming device 515 may be in the optical path of the ambient light entering the optical assembly 500 from the real world environment, and may not be in the optical path of the AR/MR/VR image elements. In some embodiments, the optical assembly 500 may also include an output aperture 525, and the optical assembly 500 may be configured such that the ambient light may enter the optical assembly 500 through the input aperture 520, pass through the photochromic dimming device 515 and the optical combiner 510 (and other optical elements arranged between the photochromic dimming device 515 and the optical combiner 510, and other optical elements arranged between the optical combiner 510 and the output aperture 525), and then exit the optical assembly 500 through the output aperture 525 to form the AR/MR image within the FOV of the user.

In some embodiments, the photochromic dimming device 515 may include an photochromic element 502 in accordance with any suitable embodiment of the present disclosure, including any embodiment shown in FIG. 1A-FIG. 4C, and various embodiments described in the present disclosure but not shown in the figures. Referring to FIG. 5A, the photochromic element 502 may have a first surface facing the real world environment, and an opposing second surface facing the eye 535. In some embodiments, the photochromic dimming device 515 may also include a first optical filter 504 disposed at (e.g., on) the first surface of the photochromic element 502. In some embodiments, the first optical filter 504 may include a gradient UV filter configured to further enhance the gradient dimming effect of the photochromic dimming device 515. In some embodiments, the photochromic dimming device 515 may also include a second optical filter 506 disposed at (e.g., on) the second surface of the photochromic element 502. The second optical filter 506 may be configured to absorb a UV light that is transmitted through the photochromic element 502. The second optical filter 506 may be configured to protect the optical combiner 510 against a radiation damage caused by bright sunlight and harmful UV rays.

In some embodiments, the optical combiner 510 may have a first surface facing the real world environment, and an opposing second surface facing the eye 535. In some embodiments, the optical assembly 500 may also include a third optical filter 565 disposed at (e.g., on) the second surface of the optical combiner 510. The third optical filter 565 may be configured to absorb a UV light that is transmitted through the optical combiner 510. The third optical filter 565 may be configured to protect the eye 535 against bright sunlight and harmful UV rays. In some embodiments, the first optical filter 504, the second optical filter 506 and/or the third optical filter 565 may also be configured to absorb a blue light that may be harmful to the eye 535. In some embodiments, the optical assembly 500 may include one or more additional optical components such as a lens, window, mirror, prism, and the like. In some embodiments, at least one of the first optical filter 504, the second optical filter 506, or the third optical filter 565 may be a gradient UV filter.

For illustrative purposes, FIG. 5A shows a schematic cross-sectional view associated with a single eye 535. In some embodiments, a similar optical assembly, separate from the optical assembly 500, may be used to direct an AR image or a MR image to another eye of the user. That is, individual photochromic dimming devices 515 may be used for each eye 535. In some embodiments, a single photochromic dimming device 515 may be used for both eyes 535. In some embodiments, the optical assembly 500 may be a binocular device, which may include individual photochromic dimming devices 515 for each eye 535. In some embodiments, the optical assembly 500 may be a headset, which may include goggles, a helmet, or one or more other headset components. In some embodiments, the light source assembly 505 may include a projection display, and the AR/MR image element may be projected onto the optical combiner 510.

In some embodiments, the optical assembly 500 may also include a controller 570, which may be configured to control the light source 505 (e.g., the electronic display) to provide the AR/MR image element. In some embodiments, the controller 570 may be configured to control the gradient dimming effect provided by the photochromic dimming device 515. For example, when the photochromic dimming device 515 is an embodiment of the photochromic dimming device 300 shown in FIGS. 3A-3D, the controller 570 may be configured to control the voltage applied to the electrodes included in the photochromic dimming device 515 to change the orientation of the LC molecules 325 (and hence the orientation of the photochromic materials 302 and 304), thereby controlling a degree of dimming effect provided by the photochromic dimming device 515 (e.g., the light absorption of the photochromic dimming device 515). In some embodiments, when the photochromic dimming device 515 is an embodiment of the photochromic dimming device 400 or 450, in which the heating element 407 is provided, the controller 570 may be configured to control a heating element to provide a gradient temperature in a photochromic element included in the photochromic dimming device 400 or 450, thereby providing a gradient temperature for the photochromic composition. Accordingly, a gradient dimming effect may be provided by the photochromic composition included in the photochromic dimming device 515. The gradient dimming effect may be a stronger dimming effect gradually decreasing to a weaker dimming effect from an upper portion of the photochromic dimming device 515 to a lower portion of the photochromic dimming device 515.

FIG. 5B illustrates a schematic y-z plane cross-sectional view of an optical assembly 530, according to another embodiment of the present disclosure. The optical assembly 530 shown in FIG. 5B may include elements that are the same as or similar to those included in the optical assembly 500 shown in FIG. 5A. Detailed descriptions of the same or similar elements may refer to the above descriptions rendered in connection with FIG. 5A, as well as descriptions rendered above in connection with FIGS. 1A-4C.

As shown in FIG. 5B, the optical assembly 530 may further include an optical switch 540 disposed between the photochromic dimming device 515 and the optical combiner 510. The optical switch 540 may be switchable between different operation states, e.g., a clear state having a maximum light transmittance, a dark state having a minimum light transmittance (which may be substantially close to zero), or one or more intermediate states having a light transmittance between the maximum light transmittance and the minimum light transmittance. The controller 570 may be communicatively coupled with the optical switch 540, and may control the switching of the optical switch 540 between different operation states. The optical switch 540 may be a suitable optical switch configured to attenuate a light by one or more of absorption, scattering, reflection, deflection, destructive interference, or a combination thereof.

In some embodiments, the optical switch 540 may include liquid crystals ("LCs"). For example, the optical switch 540 may be a guest-host liquid crystal ("LC") switch including dye-doped LCs, a twisted nematic LC switch including a polarizer and an analyzer, a polymer-stabilized LC switch, a cholesteric LC switch, a ferroelectric LC switch, an LC switch based on scattering results from nanoparticles, polymer interfaces, or electrohydrodynamic instabilities, or other LC switch configurations. In some embodiments, the optical switch 540 based on LCs may be switchable among different operation states, e.g., the clear steady, the dark state, and the intermediate state via an external field (e.g., an external electric field) applied to the LCs. In some embodiments, the second optical filter 506 (e.g., a UV filter) disposed at (e.g., on) the second surface of the photochromic element 502 may be also be configured to protect the LCs included in the optical switch 540 from degradation.

In some embodiments, the optical switch 540 may be globally dimmed, and the entire optical switch 540 may turn gray or dark. Global dimming may be used to improve the viewability of the AR/MR image elements that span the entire FOV. The optical switch 540 may also be used to reversibly switch an optically see-though NED for AR and/or MR applications to an NED for VR applications, by blocking the path of the ambient light so that an ambient image is not observed by the eye 535. For example, the NED may be switched to an optically see-though NED for AR and/or MR applications via switching the optical switch 540 to the clear state or the intermediate state, and to an NED for VR applications via switching the optical switch 540 to the dark state. In some embodiments, when the NED is used for AR and/or MR applications, the optical switch 540 may also mitigate the difference in brightness of real world and virtual scenes.

In some embodiments, the optical switch 540 may be a pixelated optical switch configured to dim a selected portion of the ambient image, via controlling the state of pixels of the pixelated optical switch. Such a process is referred to as local dimming. The AR/VR image element may be located within the selected portion of the ambient image. For example, the pixels corresponding to the selected portion of the ambient image may be configured to be in the dark state, while the pixels outside of the selected portion of the ambient image may be configured to be in the clear state or the intermediate state. In some embodiments, the pixels corresponding to the selected portion of the ambient image may be configured to be in the dark state or the intermediate state, while pixels outside of the selected portion of the ambient image may be configured to be in the clear state. The degree of opacity (e.g., light transmittance) of the pixels corresponding to the selected portion of the ambient image may be chosen to achieve a desirable readability, e.g., a desirable contrast ratio. Local dimming may be used to selectively emphasize an AR/MR image element (e.g., texts or graphs) relative to a view of the local environment. In some embodiments, the local dimming may also be used to improve the appearance of the MR image element, such as an anchored virtual object in mixed reality. For example, the anchored virtual object may be rendered to appear more solid through blocking bright lights from the outside world from appearing within the virtual object. In some embodiments, the controller 570 included in the optical assembly 530 may also be configured to control the optical switch 540 to dim a selected portion of the ambient image.

FIG. 5C illustrates a schematic y-z plane cross-sectional view of an optical assembly 550, according to another embodiment of the present disclosure. The optical assembly 550 shown in FIG. 5C may include elements that are the same as or similar to those included in the optical assembly 500 shown in FIG. 5A. Detailed descriptions of the same or similar elements may refer to the above descriptions rendered in connection with FIG. 5A. As shown in FIG. 5C, the optical assembly 550 may include a photochromic dimming device 580 and an optical combiner 510. The photochromic dimming device 580 may include the photochromic element 502, which may have a first surface facing a real world environment and an opposing second surface facing the eye 535. The photochromic dimming device 580 may include a UV switch 508 disposed between the input aperture 520 and the photochromic element 502. The UV switch 508 may be configured to attenuate a transmitted light according to one or more of absorption, scattering, reflection, deflection, destructive interference, etc. In some embodiments, the UV switch 508 may include LCs that may absorb UV or may include UV-absorbing dyes. The UV switch 508 based on LCs may have a variation in the UV transmittance when the orientations of the LCs are changed, for example, due to inherent UV absorption of the LCs and/or the inclusion of one or more UV-absorbing and visible-transparent dyes. In some embodiments, the UV switch 508 based on LCs may include one or more UV/visible transmissive substrates, such as fused silica substrates. A UV switch may also be referred to as a UV attenuator, a switchable (or tunable, or adjustable) UV attenuator, a UV filter, or a switchable (or tunable, or adjustable) UV filter.

In some embodiments, the photochromic element 502 may be globally darkened by a UV light passing through the UV switch 508. For example, the UV switch 508 may be switchable between a clear state (e.g., a UV-transmissive state), a dark state (e.g., a UV-absorbing state), or one or more intermediate states (e.g., UV-partially absorbing states). In any state, if a UV light passes through the UV switch 508, the UV light may darken the photochromic element 502 globally. In some embodiments, the photochromic element 502 may be selectively (or locally) darkened by a UV light passing through selective regions of the UV switch 508. For example, the UV switch 508 may be a pixelated UV switch including a plurality of UV switch pixels. Each UV switch pixel may be configured to operate in a clear state (e.g., a UV-transmissive state), a dark state (e.g., a UV-absorptive state), or one or more intermediate states (e.g., UV partially absorptive states or UV-partially transmissive state). The photochromic element 502 may be selectively darkened by a UV light passing through those UV switch pixels that are selectively configured to be in the UV transmissive state or UV-partially transmissive state (the clear state or any of the intermediate states). A pixelated UV switch may also be referred to as a pixelated UV attenuator, a pixelated switchable (or tunable, or adjustable) UV attenuator, a pixelated UV filter, or a pixelated switchable (or tunable, or adjustable) UV filter. In some embodiments, the UV switch 508 may be a pixelated UV switch based on LCs.

In some embodiments, the UV switch pixels based on LCs may be actively switchable by an external field (e.g., an electrical field), to select one or more pixels in a region (which may be a continuous region or a non-continuous region) for selective UV transmission (or selective UV blocking or absorbing). For example, the UV switch pixels in a selected region of the UV switch 508 may be configured to be in the clear state (or intermediate states) to allow a UV light to reach the photochromic element 502, such that a selected region of the photochromic element 502 may be darkened accordingly. The selected region of the photochromic element 502 may correspond to the selected region of the UV switch 508. The darkening of the photochromic element 502 may be localized by spatially-selective switching of one or more UV switch pixels of the UV switch 508, thereby enhancing the visibility of the AR/MR image element. In some embodiments, the UV switch pixels in a selected region of the UV switch 508 may be configured to be in the dark state to block the UV light, such that the UV light may pass through the rest of the UV switch pixels that are not selected (which remain in the clear state or in the intermediate state(s) to allow for UV transmission). In some embodiments, the UV switch 508 may be configured to provide a stronger dimming effect at an upper portion and a weaker dimming effect at a lower portion, in a manner similar to the gradient dimming effect provided by the photochromic element 502. In some embodiments, each UV switch pixel in the pixelated UV switch may be switchable (or tunable, adjustable) between a plurality of discrete states (e.g., clear state, dark state, a first intermediate state, a second intermediate state, etc.). In some embodiments, each UV switch pixel in the pixelated UV switch may be switchable (or tunable, adjustable) between a first state (e.g., clear state) and a second state (e.g., dark state) in a continuous or semi-continuous manner. The switching (or tuning, adjustment) between states can be a switching (or tuning, adjusting) between discrete states or a switching in a continuous manner at any state between a first state and a second state. Switching (or tuning, adjusting) between different UV transmissive (or absorptive) states in the discrete manner or continuous manner (or semi-continuous manner) may be achieved through suitable digital or analog adjustment or tuning of an external field (e.g., an electric field) configured for controlling the switching.

Figure 6:
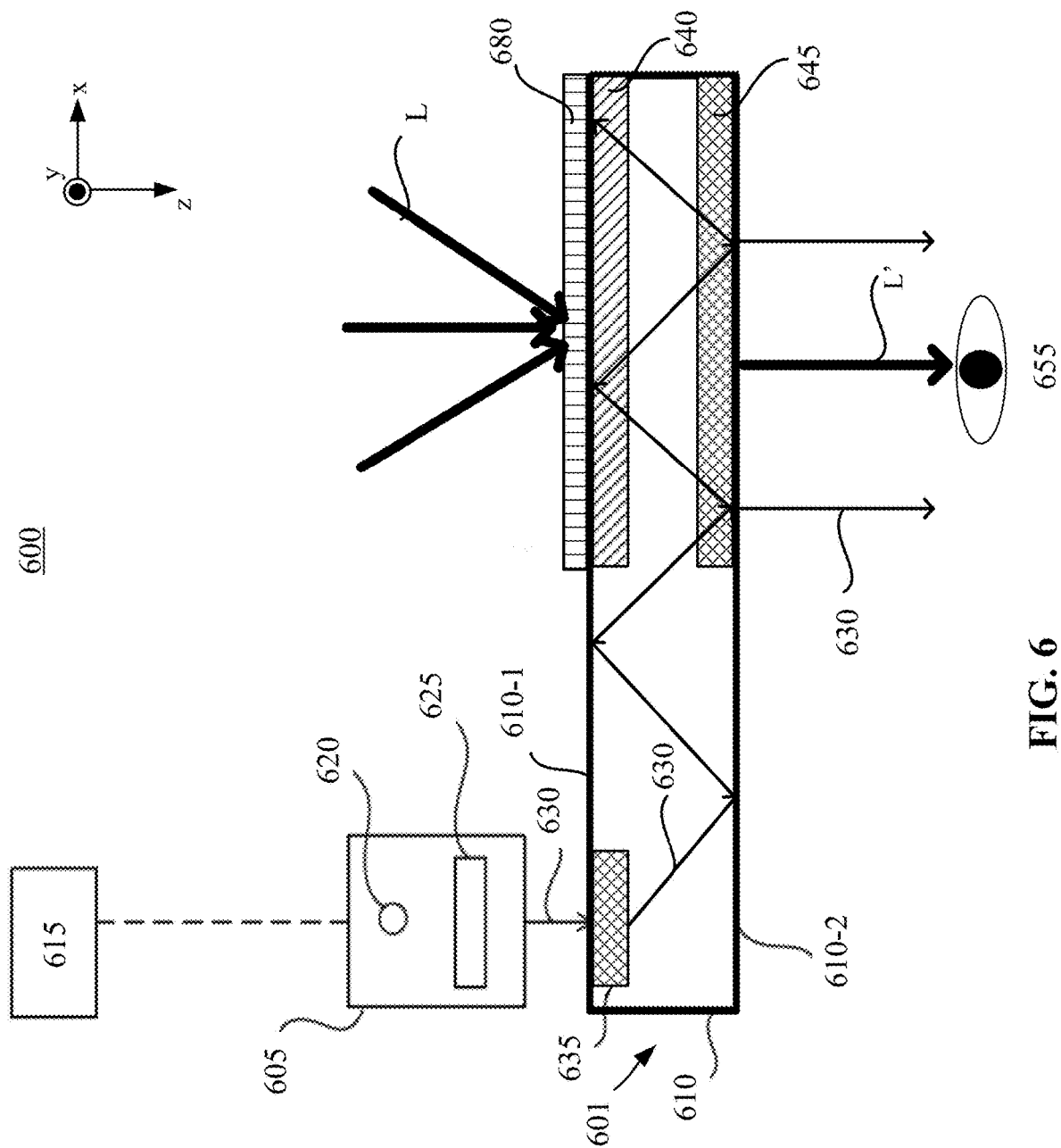
FIG. 6 illustrates a schematic diagram of an optical system, according to an embodiment of the present disclosure.

FIG. 6 illustrates a schematic diagram of an optical system 600, according to an embodiment of the present disclosure. The optical system 600 may be included in an NED. The optical system 600 may include an optical assembly in accordance with an embodiment of the present disclosure, such as the optical assembly 500 shown in FIG. 5A, the optical assembly 530 shown in FIG. 5B, or the optical assembly 550 shown in FIG. 5C. The optical system 600 may include an optical combiner 601, a light source assembly 605, a photochromic dimming device 680, and a controller 615. The optical combiner 601 may be an embodiment of the optical combiner 510 shown in FIGS. 5A-5C. The photochromic dimming device 680 may be an embodiment of the photochromic dimming device 100 shown in FIG. 1A, the photochromic dimming device 200 shown in FIG. 2A, the photochromic dimming device 300 shown in FIG. 3A, the photochromic dimming device 400 shown in FIG. 4A, the photochromic dimming device 450 shown in FIG. 4B, the photochromic dimming device 515 shown in FIGS. 5A and 5B, or the photochromic dimming device 580 shown in FIG. 5C.

As shown in FIG. 6, the optical combiner 601 may include a waveguide 610 configured to redirect an image light 630 received from the light source assembly 605 to an eye 655 of a user. The light source assembly 605 and the waveguide 610 may form a display assembly, e.g., a waveguide display system, which may be a component of an NED. The waveguide display system may include additional elements not shown in FIG. 6, or may omit certain elements shown in FIG. 6, depending on the applications. The light source assembly 605 may include a light source 620 and an optical device 625. The light source 620 may include any suitable light source, e.g., a laser diode, a vertical cavity surface emitting laser, a light emitting diode, or a combination thereof. In some embodiments, the light source 620 may include a display panel, such as a liquid crystal display ("LCD") panel, an liquid-crystal-on-silicon ("LCoS") display panel, an organic light-emitting diode ("OLED") display panel, a micro light-emitting diode ("micro-LED") display panel, a digital light processing ("DLP") display panel, or a combination thereof. In some embodiments, the light source 620 may include a self-emissive panel, such as an OLED display panel, a micro-LED display panel, or a combination thereof. In some embodiments, the light source 620 may include a display panel that may be illuminated by an external source, such as an LCD panel, an LCoS display panel, a DLP display panel, or a combination thereof. Examples of an external source may include a laser, an LED, an OLED, or a combination thereof. The optical device 625 may include one or more optical components configured to condition the light from the light source 620. For example, the optical device 625 may be configured to perform at least one of transmitting the light, attenuating the light, expanding the light, collimating the light, or adjusting an orientation of the light. The controller 615 may be configured to control the optical device 625 to perform the conditioning of the light.

The light source assembly 605 may generate the image light 630 corresponding to an AR image element, an MR image element, or a VR image element, and output the image light 630 to an in-coupling element 635 disposed at a first portion of the waveguide 610. In some embodiments, the waveguide 610 may expand, guide, direct, or transmit the image light 630 to the eye 655 of the user. The waveguide 610 may receive the image light 630 at the in-coupling element 635 disposed at the first portion of the waveguide 610, and guide the received image light 630 to an out-coupling element 645 disposed at a second portion of the waveguide 610. The out-coupling element 645 may decouple the image light 630 out of the waveguide 610 toward the eye 655.

In some embodiments, the in-coupling element 635 may be configured to couple the image light 630 from the light source assembly 605 into the waveguide 610. The waveguide 610 may include a first surface (or side) 610-1 facing the real world environment and an opposing second surface (or side) 610-2 facing the eye 655. The in-coupling element 635 may be disposed at (e.g., deposited at, coated at, formed at, or attached to) the first surface 610-1 or the second surface 610-2 of the waveguide 610. In some embodiments, as shown in FIG. 6, the in-coupling element 635 may be disposed at (e.g., deposited at, coated at, formed at, or attached to) the first surface 610-1 of the waveguide 610. In some embodiments, the in-coupling element 635 may be disposed at (e.g., deposited at, coated at, formed at, or attached to) the second surface 610-2 of the waveguide 610. The in-coupling element 635 may include, for example, a surface relief grating, a volume hologram, a polarization grating, a polarization volume hologram, a metasurface grating, other suitable types of diffractive elements, or a combination thereof. In some embodiments, the in-coupling element 635 may include a diffraction grating. A pitch of the diffraction grating may be configured to enable total internal reflection of the image light 630 within the waveguide 610. Accordingly, the image light 630 may propagate internally within the waveguide 610 via total internal reflection from the in-coupling element 635 to the out-coupling element 645. In some embodiments, the in-coupling element 635 may also be referred to as an in-coupling grating.

The out-coupling element 645 may be disposed at (e.g., deposited at, coated at, formed at, or attached to) the first surface 610-1 or the second surface 610-2 of the waveguide 610. In some embodiments, as shown in FIG. 6, the out-coupling element 645 may be disposed at (e.g., deposited at, coated at, formed at, or attached to) the second surface 610-2 of the waveguide 610. In some embodiments, the out-coupling element 645 may be disposed at (e.g., deposited at, coated at, formed at, or attached to) the first surface 610-1 of the waveguide 610. In some embodiments, the out-coupling element 645 may include a surface relief grating, a volume hologram, a polarization grating, a polarization volume hologram, a metasurface grating, other suitable types of diffractive elements, or a combination thereof. In some embodiments, the out-coupling element 645 may include a diffraction grating. A pitch of the diffraction grating may be configured to enable the out-coupling element 645 to decouple the image light 630 out of the waveguide 610. In some embodiments, the out-coupling element 645 may be referred to as an out-coupling grating.

In some embodiments, the optical combiner 601 may include additional gratings configured to redirect, fold, and/or expand the pupil of the light source assembly 605. In some embodiments, the light source assembly 605 may include a projector. In some embodiments, the optical combiner 601 may include a directing element 640 configured to redirect the image light 630 to the out-coupling element 645. The directing element 640 may be disposed at the second portion of the waveguide 610. For example, the directing element 640 may be disposed at (e.g., deposited at, coated at, formed at, or attached to) the first surface 610-1 of the waveguide 610, facing the out-coupling element 645 disposed at the second surface 610-2. In some embodiments, the directing element 640 and the out-coupling element 645 may have a similar structure. The directing element 640 may include, for example, a surface relief grating, a volume hologram, a polarization grating, a polarization volume hologram, a metasurface grating, other suitable types of diffractive elements, or a combination thereof. In some embodiments, the directing element 640 may be a diffraction grating. The pitch of the diffraction grating may be configured, such that the directing element 640 may direct the image light 630 toward a surface of the out-coupling element 645 at a predetermined incident angle. In some embodiments, the directing element 640 may be referred to as a folding grating. In some embodiments, multiple functions, e.g., redirecting, folding, and/or expanding the pupil of the optical combiner 601 may be combined into a single grating, e.g. the out-coupling grating 645. In some embodiments, the above-mentioned gratings may be divided in a plurality of sections (or subgratings) to provide other functions, such as for tiling the FOV.

The waveguide 610 may include one or more materials configured to facilitate the total internal reflection of the image light 630. The waveguide 610 may include, for example, a plastic, a glass, a polymer, or a combination thereof. In some embodiments, the waveguide 610 may have a small form factor. The controller 615 may be communicatively coupled with the light source assembly 605 and configured to control the operation of the light source assembly 605. In some embodiments, the waveguide 610 may output the expanded image light 630 to the eye 655 with an increased (or expanded) FOV. For example, the expanded image light 630 may be provided to the eye 655 with a diagonal FOV (in x and y directions) of 60 degrees or greater and 150 degrees or less. The waveguide 610 may be configured to provide an eye-box with a width that is greater than or equal to 6 mm and equal to or less than 50 mm, and a height that is greater than or equal to 6 mm and equal to or less than 60 mm.

In some embodiments, the waveguide display system may include a plurality of light source assemblies 605 and a plurality of waveguides 610. Each of the light source assemblies 605 may be configured to emit a monochromatic image light of a specific wavelength or a specific wavelength band corresponding to a primary color (e.g., red, green, or blue). The plurality of waveguides 610 may be stacked together to output an expanded multi-colored image light 630. In some embodiments, the plurality of waveguides 610 may be separated by air gaps. In some embodiments, the plurality of waveguides 610 may be separated by a low refractive index material, such as a nanoporous film. In some embodiments, the waveguide display system may include a stack of waveguides 610. Each waveguide 610 may be configured to provide a portion of the total field of view and/or a portion of a desirable color spectrum of the virtual image. With the disclosed waveguide display system, physical displays and electronics may be moved to a side of a front rigid body of an NED. As a result, a substantially unobstructed view of the real world environment may be provided to a user of the NED, therefore enhancing the AR user experience.

Referring back to FIG. 6, the optical system 600 may include a photochromic dimming device 680. The photochromic dimming device 680 may be disposed at (e.g., deposited at, coated at, formed at, or attached to) the first surface 610-1 of the waveguide 610. The photochromic dimming device 680 may be configured to provide a gradient dimming effect to an incoming light L from the real world environment, in a direction from an upper portion to a lower portion of the photochromic dimming device 615. Thus, the photochromic dimming device 615 may shield the eye 655 of the user from bright overhead sunlight or a bright overhead light source at the upper portion, and allow more lights to transmit through the lower portion of the photochromic dimming device 615 at the lower portion. The photochromic dimming device 680 may be any of the embodiments of the photochromic dimming device disclose in FIG. 1A-FIG. 5C.

Figure 7:
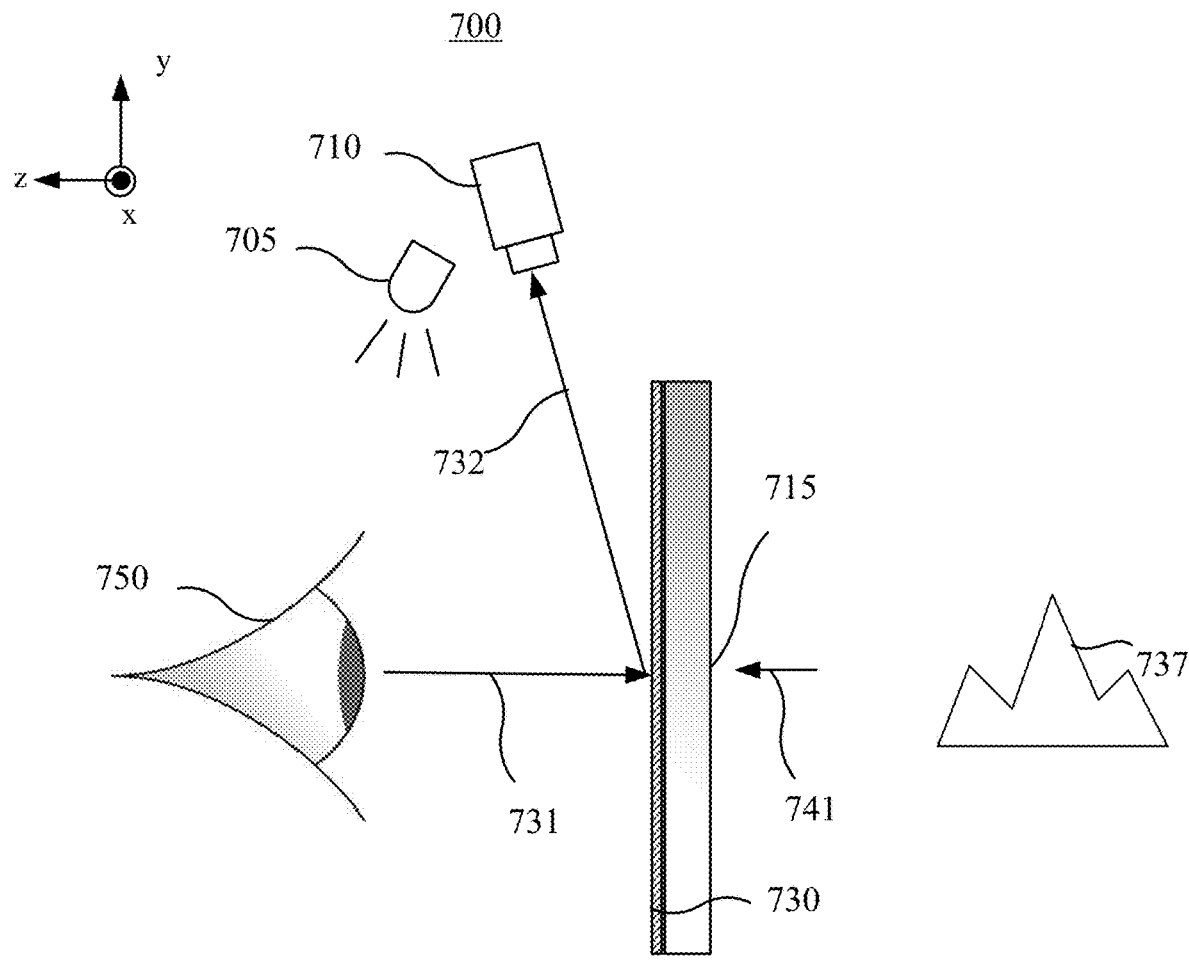
FIG. 7 illustrates a schematic cross-sectional view of an optical system, according to another embodiment of the present disclosure.

In some embodiments, a photochromic dimming device in accordance with an embodiment of the present discourse may be used with an eye-tracking combiner. FIG. 7 illustrates a y-z plane cross-sectional view an eye-tracking system 700 including a photochromic dimming device 715, according to an embodiment of the present disclosure. The eye photochromic dimming device 715 may be an embodiment of the photochromic dimming device 100 shown in FIG. 1A, the photochromic dimming device 200 shown in FIG. 2A, the photochromic dimming device 300 shown in FIG. 3A, the photochromic dimming device 400 shown in FIG. 4A, the photochromic dimming device 450 shown in FIG. 4B, the photochromic dimming device 515 shown in FIGS. 5A and 5B, or the photochromic dimming device 580 shown in FIG. 5C.

As shown in FIG. 7, a light source 705 may emit an infrared ("IR") light to illuminate one or two eyes 750 of a user of the NED. The IR light is not visible to the human eyes and thus, may not distract the user of the NED during operation. An optical sensor 710, such as a camera, may be disposed near the eye 750. The optical sensor 710 may be configured to receive an IR light reflected by the eye 750 and generate an image of the eye 750 based on the received IR light. The image of the eye 750 may be processed to extract information (e.g., a gaze direction, a movement direction, a psychological state, etc.) of the eye 750. As shown in FIG. 7, an eye-tracking combiner 730 may be disposed facing the eye 750 and the optical sensor 710. An IR light 731 reflected by the eye 750 may be redirected by the eye-tracking combiner 730 as an IR light 732 toward the optical sensor 710. The photochromic dimming device 715 may be disposed at a side of the eye-tracking combiner 730 facing the real world environment (represented by a mountain 737 in FIG. 7). The photochromic dimming device 715 may provide a gradient dimming effect to an incoming light 741 from the real world environment, in a direction from an upper portion to a lower portion of the photochromic dimming device 715. Thus, the photochromic dimming device 715 may shield the eye 750 of the user from bright overhead sunlight or a bright overhead light source at the upper portion, and while allowing more lights to transmit through the lower portion of the photochromic dimming device 715.

In some embodiments, the light emitted by the light source 705 may include a relatively narrow spectrum or a relatively broad spectrum. In some embodiments, one or more wavelengths of the light may be in the IR spectrum. For example, in some embodiments, the spectrum of the light source 705 may be within, overlap, or encompass the IR spectrum. In some embodiments, the light source 705 may emit lights in the near infrared ("NIR") band (about 750 nm to about 1050 nm), or some other portion of the electromagnetic spectrum. The IR light may be reflected by a pupil area of the eye 750. In some embodiments, the IR light may be reflected by the entire eye 750. In some embodiments, the IR light may be reflected by a body portion of the user adjacent the eye 750, such as a skin located above, below, to the left of, or to the right of the eye 750. In some embodiments, the IR light may be reflected by an area of a body portion including the eye 750 and skins surrounding the eye 750.

The optical sensor 710 may be sensible to a light having a wavelength within a spectrum that includes IR spectrum. In some embodiments, the optical sensor 710 may be sensitive to an IR light and may not be sensible to a visible light. In some embodiments, the optical sensor 710 may include a charge-coupled device ("CCD") camera, a complementary metal-oxide-semiconductor ("CMOS") sensor, an N-type metal-oxide-semiconductor ("NMOS") sensor, a pixelated camera, other suitable camera, or a combination thereof. In some embodiments, the optical sensor 710 may include a processor configured to process the infrared light.

The processor may generate an image of the eye 750. The processor may analyze the image of the eye 750 to obtain information for eye-tracking and other subsequent operations. For example, the information may be used, e.g., by the processor or another suitable device, to determine what information to present to the user or the layout of the presentation of the information, etc. In some embodiments, the optical sensor 710 may include a non-transitory computer-readable storage medium (e.g., a computer-readable memory) configured to store data or information, such as the generated images. In some embodiments, the non-transitory computer-readable storage medium may store codes or instructions executable by the processor to perform various steps of a method disclosed herein. In some embodiments, the processor and the non-transitory computer-readable medium may be separately provided from the optical sensor 710. For example, the eye-tracking system 700 may include a controller communicatively coupled with the optical sensor 710 and configured to receive data from the optical sensor 710. The controller may be configured to analyze the data (e.g., images of the eye 750) received from the optical sensor 710 to obtain information for eye-tracking or other purposes.

In some embodiments, an optical system (e.g., an NED) may include both an image combiner and an eye-tracking combiner, where one of the image combiner and eye-tracking combiner may be disposed further away from the eye than the other combiner. In some embodiment, the photochromic dimming device may be disposed at a side of a combiner facing the real world environment, i.e., the combiner that is disposed furthest away from the eye among the combiners (e.g., the outmost combiner).

Figure 8A:
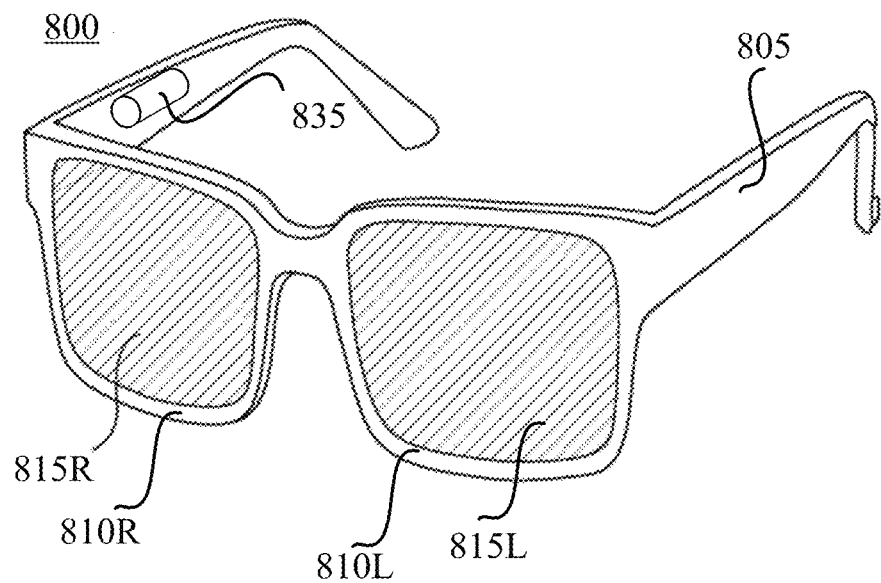
FIG. 8A illustrates a schematic perspective view of a near-eye display ("NED"), according to an embodiment of the present disclosure.

FIG. 8A illustrates a schematic diagram of an NED 800 according to an embodiment of the present disclosure. The NED 800 may be in any suitable form such that it is disposed near an eye (or eyes) of a user. For illustrated purposes, an eyeglass type of structure is used as an example of the NED 800. As shown in FIG. 8A, the NED 800 may include a frame 805 configured to be worn by a user. The NED 800 may include a left-eye display system 810L and a right-eye display system 810R, which are mounted to the frame 805. Each of the left-eye display system 810L and the right-eye display system 810R may include one or more image display components configured to project computer-generated virtual images onto a left display window 815L and a right display window 815R in the user's FOV, respectively. An example of the left-eye display system 810L and the right-eye display system 810R may include a transparent display system, such as a waveguide display system. For illustrative purposes, FIG. 8A illustrates that the display system may include a light source assembly 835 coupled to (e.g., mounted on) the frame 805. The NED 800 may function as a VR device, an AR device, an MR device, or a combination thereof. In some embodiments, when the NED 800 functions as an AR and/or an MR device, the right display window 815R and the left display window 815L may be fully or at least partially transparent from the perspective of the user, thereby enabling the user to view a surrounding real world environment. In some embodiments, when the NED 800 functions as a VR device, the right display window 815R and the left display window 815L may be opaque. As a result, the user may be immersed in the VR imagery provided by the NED.

Figure 8B:
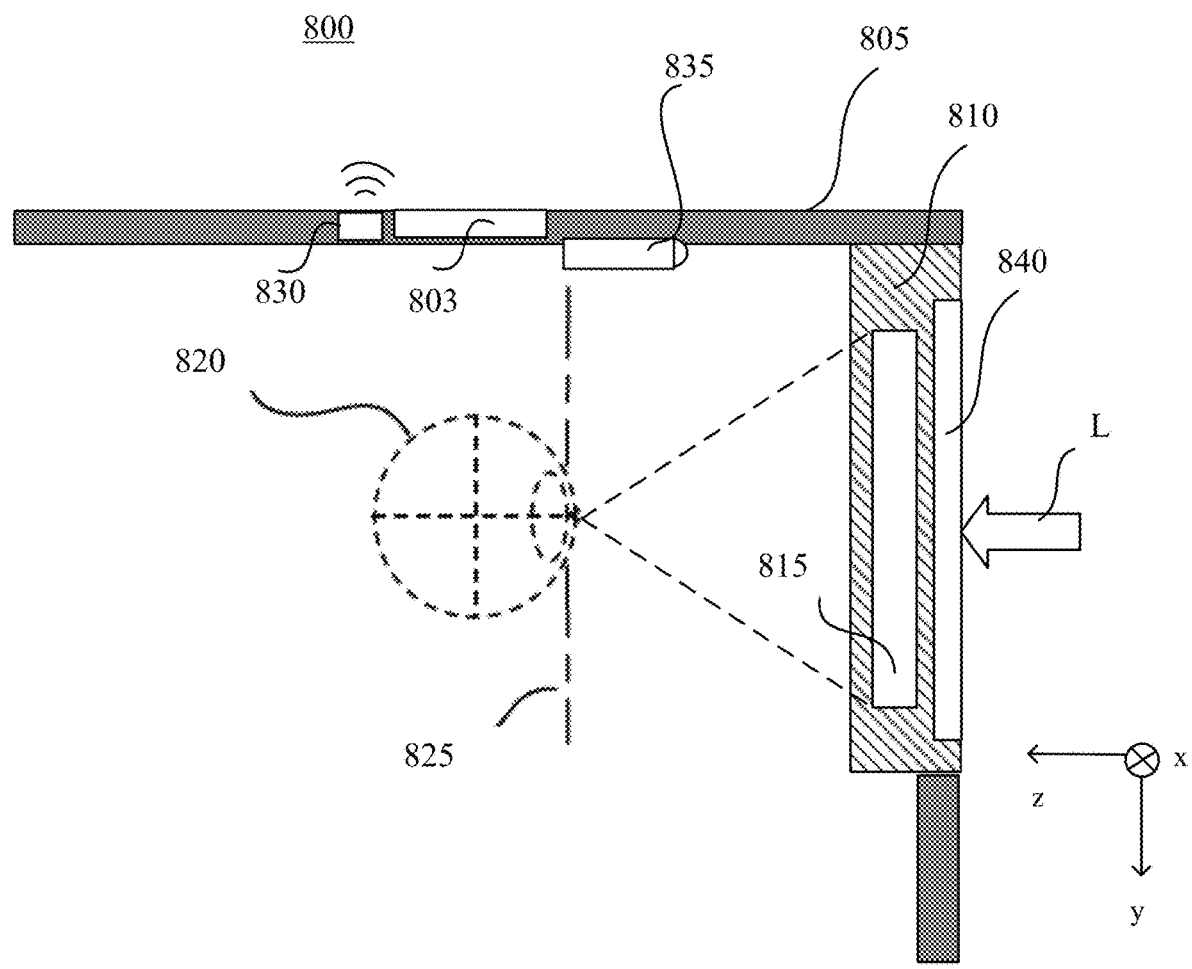
FIG. 8B illustrates a schematic cross-sectional view of a half of the NED shown in FIG. 8A, according to an embodiment of the present disclosure.

FIG. 8B is a schematic cross-sectional view of the NED 800 shown in FIG. 8A, according to an embodiment of the present disclosure. As shown in FIG. 8B, a display system 810 (which may represent the right-eye display system 810R or the left-eye display systems 810L) may include an optical combiner 815. In some embodiments, the display system 810 may also include the light source assembly 835 as a component. In some embodiments, the NED 800 may include a lens block (not shown in FIG. 8B). The display system 810 and the lens block together may provide an image light to an exit pupil 825. The exit pupil 825 may be a location where an eye 820 of the user is positioned. For illustrative purposes, FIG. 8B illustrates the schematic cross-sectional view associated with a single eye 820. A similar display system, separate from the display system 810, may be included in the other half of the NED 800 (that is not shown) to direct the image light to another eye of the user.

In some embodiments, the NED 800 may include a photochromic dimming device 840 disposed at a side of the optical combiner 815 facing the real world environment. The photochromic dimming device 840 may be an embodiment of the photochromic dimming device 100 shown in FIG. 1A, the photochromic dimming device 200 shown in FIG. 2A, the photochromic dimming device 300 shown in FIG. 3A, the photochromic dimming device 400 shown in FIG. 4A, the photochromic dimming device 450 shown in FIG. 4B, the photochromic dimming device 515 shown in FIGS. 5A and 5B, or the photochromic dimming device 580 shown in FIG. 5C. The photochromic dimming device 840 may be configured to provide a gradient dimming effect to dim an incoming light L from the real world environment.

In some embodiments, the NED 800 may also include an eye-tracking device (not shown in FIG. 8B) configured to determine eye-tracking information for tracking the eye 820. In some embodiments, the NED 800 may include a processor 803 configured to execute one or more computer programs, computer instructions, or codes to effectuate various controls or processes, such as the generation of the image light. In some embodiments, the processor 803 may include a controller or may be included in a controller, which may be at least one of the controller included in the optical assemblies shown in FIG. 5A-5C, the controller included in the optical system 600 shown in FIG. 6, or the controller included in the eye-tracking system 700 shown in FIG. 7. A non-transitory computer readable medium (not shown in FIG. 8B) may be configured to store or encode thereon software instructions or codes that, when executed by the processor 803, may cause the processor 803 to generate control signals for controlling or performing various methods, processes, or operations disclosed herein. The software instructions or codes may be pre-stored in the NED 800, or may be transmitted to the NED 800 via a wireless transmitter 830 from another computer or device through a suitable network, such as a WiFi or a cellular network. In some embodiments, the NED 800 may include an interface for physically connecting the NED 800 with another computer or device to receive the software instructions or codes.

The gradient photochromic dimming device disclosed in the present disclosure may be achieved through other manners. For example, in some embodiments, the photochromic dimming device may include a single photochromic material non-uniformly distributed in the vertical direction to create a gradient absorption effect or profile. The non-uniform distribution may be referred to as a gradient distribution. The gradient distribution may be achieved through a uniform density and a gradient thickness. In some embodiments, the gradient distribution may be achieved through a gradient density and a uniform thickness. In some embodiments, the gradient absorption effect created by the non-uniform distribution of the photochromic material may be combined with any other suitable features and/or embodiments disclosed in the present disclosure. For example, the gradient absorption effect created by the non-uniform distribution of the photochromic material may be combined with a gradient UV filter. For example, the gradient UV filter may be disposed in parallel with the photochromic dimming device, and may have the same gradient direction as the photochromic dimming device. In some embodiments, the gradient absorption effect created by the non-uniform distribution of the photochromic material may be combined with the heating element described above and depicted in FIG. 4C.

For example, in some embodiments, the photochromic dimming device may include a mixture of a photochromic material (e.g., a photochromic material dye) and a non-photochromic UV absorbing material (e.g., a non-photochromic material dye). A portion of the UV light (e.g., UV photons) may be absorbed by the non-photochromic material and may not contribute to the color change. A lower portion of the photochromic dimming device may include a higher concentration of the UV absorbing material (and a lower concentration of the photochromic material) as compared to the upper portion. Thus, the steady-state transmission in the lower region may be greater than that in the upper region, and the light absorption effect in the upper portion may be greater than that in the lower portion. The gradient mixture may be combined with features and/or embodiments described above. For example, the gradient mixture may be combined with one or more gradient UV filters. In some embodiments, the gradient mixture may be combined with the heating element described above and depicted in FIG. 4C.

A heat gradient may be generated by a single heating element along the bottom edge of the lens, or by a resistive heating element disposed over the photochromic layer. With a resistive heating element, the element may have a greater density of heat-generating components near the bottom of the lens. The size of the heat-generating components may vary along the lens. For example, a larger wire may dissipate less heat than a smaller wire. Thus, wires of different sizes may be disposed along the lens to create the heat gradient. In some embodiments, electrically-separate heat-generating components may each be provided with a different voltage difference. A larger voltage difference may result in more heating. Thus, the heat-generating components may be separately provided with a voltage difference, and the voltage differences may be different to create a heat gradient. In some embodiments, the above-described various configurations may be used in combination. In some embodiments, the resistive heating element may be made from a transparent conductor, or may be made from opaque metal traces, which may be made thin to be effectively invisible.

The disclosed gradient photochromic designs or configurations may be used in combination with other devices. For example, a combined photochromic-liquid crystal shutter may be achieved to allow the photochromic material (e.g., dye) to be actively switched into a lower-absorption configuration.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive. The disclosed embodiments described in the specification and/or shown in the drawings be combined in any suitable manner. For example, elements shown in one embodiment (e.g., in one figure) but not another embodiment (e.g., in another figure) may nevertheless be included in the other embodiment. Elements shown in one embodiment (e.g., in one figure) may be repeated to form a stacked configuration. Elements shown in different embodiments (e.g., in different figures) may be combined to form a variation of the disclosed embodiments. Elements shown in different embodiments may be repeated and combined to form variations of the disclosed embodiments. Elements mentioned in the descriptions but not shown in the figures may still be included in a disclosed embodiment or a variation of the disclosed embodiment. For example, in an optical device or system disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined and/or repeated in various manners to form variations of the disclosed embodiments. These variations of the disclosed embodiments are also within the scope of the present disclosure.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical dimming device, comprising:
    a photochromic element including a photochromic composition,
    wherein the photochromic composition includes a combination of a first photochromic material and a second photochromic material having different steady-state absorption profiles,
    wherein each of the first photochromic material and the second photochromic material is distributed in the photochromic element from a top portion of the photochromic element to a bottom portion of the photochromic element, and
    wherein, in a direction from the top portion to the bottom portion of the photochromic element, a concentration of the first photochromic material in the combination decreases and a concentration of the second photochromic material in the combination increases.

2. The optical dimming device of claim 1, wherein the first photochromic material at a dark steady-state has a higher absorption for at least a visible light than the second photochromic material at the dark steady-state.

3. The optical dimming device of claim 1, wherein the top portion and the bottom portion of the photochromic element are located at opposite ends of the photochromic element.

4. The optical dimming device of claim 1, wherein the photochromic element includes a base substrate, and the photochromic composition is disposed in a form of a layer at a surface of the base substrate.

5. The optical dimming device of claim 1, wherein the photochromic composition is at least partially integrally disposed in a main body of the photochromic element.

6. The optical dimming device of claim 1, wherein the photochromic composition further comprises liquid crystals doped with the combination of the first photochromic material and the second photochromic material.

7. The optical dimming device of claim 1, wherein at least one of the first photochromic material or the second photochromic material includes liquid crystals containing one or more photochromic moieties.

8. The optical dimming device of claim 1, further comprising a first gradient ultraviolet filter disposed at a first surface of the photochromic element.

9. The optical dimming device of claim 8, further comprising a second ultraviolet filter disposed at a second surface of the photochromic element, the second surface being opposite to the first surface where the first gradient ultraviolet filter is disposed.

10. An optical dimming device, comprising:
    a photochromic element including a photochromic composition; and
    a heating element coupled to the photochromic element and configured to realize a gradient temperature of the photochromic element,
    wherein the heating element includes a plurality of heating units, and a distribution density of the heating units changes along a direction from a first portion to a second portion of the photochromic element in a gradient manner.

11. The optical dimming device of claim 10, wherein the heating element includes a resistive heating element, and the heating units include resistive heating units.

12. The optical dimming device of claim 10, wherein the photochromic element includes a base substrate, and the photochromic composition is disposed in a form of a layer at a surface of the base substrate.

13. The optical dimming device of claim 12, wherein the heating element is disposed between the photochromic composition and the base substrate.

14. The optical dimming device of claim 10, wherein the photochromic composition is at least partially integrally disposed in a main body of the photochromic element.

15. The optical dimming device of claim 10, further comprising a first gradient ultraviolet filter disposed at a first surface of the photochromic element.

16. The optical dimming device of claim 15, further comprising a second ultraviolet filter disposed at a second surface of the photochromic element, the second surface being opposite to the first surface where the first gradient ultraviolet filter is disposed.

17. An optical assembly, comprising:
    an optical combiner including a first side facing a real world environment and an opposing second side facing an eye-box of the optical assembly; and
    an optical dimming device disposed at the first side of the optical combiner and configured to provide a gradient dimming effect to a first light from the real world environment and output a second light to the optical combiner, the optical dimming device including:
        a photochromic element including a combination of a first photochromic material and a second photochromic material having different steady-state absorption profiles for the first light,
        wherein each of the first photochromic material and the second photochromic material is distributed in the photochromic element from a top portion of the photochromic element to a bottom portion of the photochromic element,
        wherein in a direction from the top portion to the bottom portion of the photochromic element, a concentration of the first photochromic material in the combination decreases and a concentration of the second photochromic material in the combination increases, and
    wherein the optical combiner is configured to combine a third light from a light source and the second light and output a combined light to the eye-box.

18. The optical assembly of claim 17, wherein the first photochromic material at a dark steady-state has a higher absorption for at least a visible light than the second photochromic material at the dark steady-state.

19. The optical assembly of claim 17, further comprising an optical switch disposed between the optical combiner and the optical dimming device.

20. The optical assembly of claim 17, wherein the optical dimming device has a first side facing the real world environment and an opposing second side facing the eyebox of the optical assembly, and the optical assembly further includes a pixelated ultraviolet switch disposed at the first side of the optical dimming device.

* * * * *